(12) United States Patent
Yamamoto et al.

(10) Patent No.: US 7,551,530 B2
(45) Date of Patent: Jun. 23, 2009

(54) OPTICAL DISC RECORDING SYSTEM

(75) Inventors: Naoto Yamamoto, Tokyo (JP); Shigeru Shimonou, Tokyo (JP); Masatsugu Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 588 days.

(21) Appl. No.: 11/136,863

(22) Filed: May 25, 2005

(65) Prior Publication Data

US 2006/0181981 A1     Aug. 17, 2006

(30) Foreign Application Priority Data

May 25, 2004   (JP)   ............................. 2004-154422
Jun. 22, 2004   (JP)   ............................. 2004-183350

(51) Int. Cl.
   *G11B 5/09*   (2006.01)
(52) U.S. Cl. .................. 369/47.1; 369/59.25; 369/53.2
(58) Field of Classification Search .................. None
   See application file for complete search history.

(56) References Cited

U.S. PATENT DOCUMENTS

| | | | |
|---|---|---|---|
| 5,701,281 A | | 12/1997 | Sano |
| 5,940,853 A | | 8/1999 | Ooi |
| 5,978,336 A | | 11/1999 | Mine et al. |
| 6,151,281 A | * | 11/2000 | Van Der Enden et al. .. 369/30.11 |
| 6,208,602 B1 | | 3/2001 | Frank |
| 6,330,392 B1 | | 12/2001 | Nakatani et al. |
| 6,333,904 B1 | | 12/2001 | Hashimoto |
| 6,600,707 B2 | | 7/2003 | Tsukada |
| 6,621,783 B1 | | 9/2003 | Murata |

(Continued)

FOREIGN PATENT DOCUMENTS

| EP | 0 350 920 A2 | 1/1990 |
|---|---|---|
| EP | 0 798 711 A2 | 10/1997 |

(Continued)

OTHER PUBLICATIONS

ANSI T10/1545-D: "Information Technology—Multimedia Commands—4 (MMC-4)"; on CD-ROM Disc in file "Information Technology Multi Media Commands—4(MMC-4).pdf."
ISO/IEC 20563 "80 nm (1.23 Gbytes per side) and 120 nm (3.95 Gbytes per side)—recordable disc" on CD-ROM disc in file "80nm and 120nm Recordable Disc.pdf."

(Continued)

*Primary Examiner*—Wayne R Young
*Assistant Examiner*—Van N Chow
(74) *Attorney, Agent, or Firm*—Dickstein Shapiro LLP

(57) ABSTRACT

An optical disc recording system includes a host apparatus configured to issue commands; and an optical disc recording apparatus configured to carry out a process corresponding to each of the commands, and to reply a response data to the command to the host apparatus. The host apparatus issues a record command as one of the commands to record a record data in an optical disc medium, and an optical disc recording apparatus records the record data in a data area in a predetermined format in response to the record command, wherein the optical disc comprises the data area and a first control data recording area. The optical disc recording apparatus additionally sets each of second control data recording areas in the data area in association with a command from the host apparatus as one of the commands, and a record status control data is recorded in the first or second control data recording area to indicate record status of the record data. At least a part of a second control data recording area associated data with at least one of the second control data recording areas is shared by the host apparatus and the optical disc recording apparatus.

18 Claims, 21 Drawing Sheets

U.S. PATENT DOCUMENTS

| | | | |
|---|---|---|---|
| 6,628,584 | B1 | 9/2003 | Heemskerk et al. |
| 6,628,602 | B2 | 9/2003 | Ohno et al. |
| 6,636,461 | B2 | 10/2003 | Tsukada et al. |
| 6,728,186 | B2 | 4/2004 | Weijenbergh et al. |
| 6,876,612 | B2 | 4/2005 | Yoneyama et al. |
| 6,904,008 | B2 | 6/2005 | Kawashima et al. |
| 6,938,162 | B1 * | 8/2005 | Nagai et al. ............. 713/189 |
| 7,050,701 | B1 | 5/2006 | Sasaki et al. |
| 7,196,992 | B2 | 3/2007 | Kim |
| 2002/0024923 | A1 | 2/2002 | Ohno et al. |
| 2002/0136134 | A1 | 9/2002 | Ito et al. |
| 2003/0067859 | A1 | 4/2003 | Weijenbergh et al. |
| 2003/0081525 | A1 | 5/2003 | Yoneyama et al. |
| 2003/0214890 | A1 | 11/2003 | Lee et al. |
| 2005/0083767 | A1 | 4/2005 | Terada et al. |
| 2005/0152235 | A1 | 7/2005 | Hoshizawa |
| 2005/0185556 | A1 * | 8/2005 | Oishi et al. ............. 369/53.37 |
| 2005/0265171 | A1 * | 12/2005 | Yamamoto et al. ....... 369/47.14 |
| 2006/0176787 | A1 | 8/2006 | Blum |
| 2007/0291627 | A1 * | 12/2007 | Park ............. 369/275.3 |

FOREIGN PATENT DOCUMENTS

| | | |
|---|---|---|
| EP | 0817195 | 1/1998 |
| EP | 1 083 748 | 3/2001 |
| EP | 1 291 871 A2 | 3/2003 |
| JP | 63-146287 | 6/1988 |
| JP | 2-280243 | 11/1990 |
| JP | 06-338139 | 12/1994 |
| JP | 09-265630 | 10/1997 |
| JP | 11-86418 | 3/1999 |
| JP | 2000-504463 | 4/2000 |
| JP | 2002-312940 | 10/2002 |
| JP | 2003-228853 | 8/2003 |
| JP | 2003-296040 | 10/2003 |
| JP | 2004-039186 | 2/2004 |
| JP | 2005-032413 | 2/2005 |
| JP | 2005-190539 | 7/2005 |
| JP | 2006-514389 | 4/2006 |
| JP | 2006-514390 | 4/2006 |
| WO | WO-03/075265 | 9/2003 |

OTHER PUBLICATIONS

ECMA: Standardizing Information and Communication Systems: 80 mm (1,46 Gbytes per side) and 120 mm (4,70 Gbytes per side) DVD Re-recordable Disk (DVD-RW), Standard ECMA-338, pp. 1-148 (Dec. 2002). Retrieved from the Internet on Aug. 4, 2005: URL:http://www.ecma-international.org/publications/standards/Ecma-338.ht.

Pioneer: "DVD-Recording—Technical Information—Pioneer Australia", www.pioneeraus.com.au (2002).

ECMA: Standardizing Information and Communication Systems: Standard ECMA-267, 3rd edition: 120 mm DVD-Read-Only Disk, No. 272, pp. 1-86 (Apr. 2001).

Proposal for a SFF Committee Specification of: Mt. Fuji Commands for Multimedia Devices, SFF8090i v5, Revision 1.59, Status: Draft for Review, pp. 114-175 (Feb. 18, 2004).

* cited by examiner

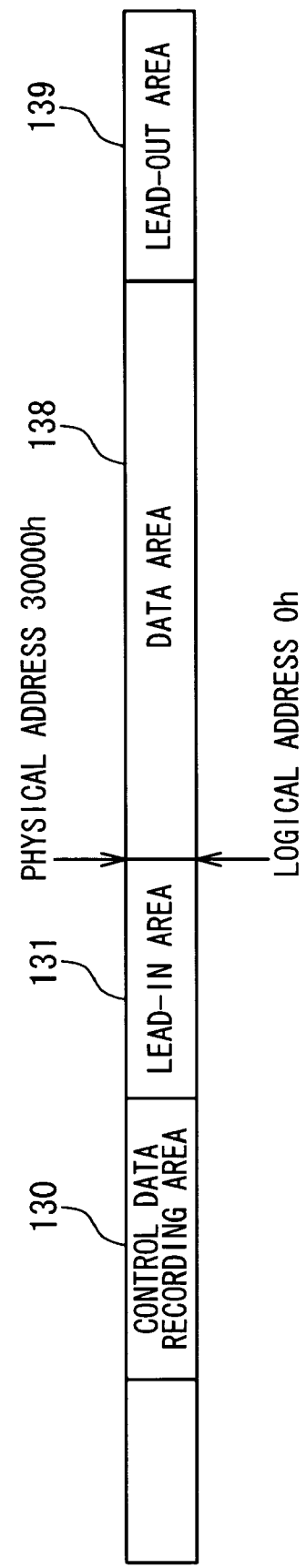

Fig. 2

| NO. | COMMAND ISSUED FROM HOST APPARATUS AND MAIN ARGUMENT | OPERATION OF OPTICAL DISC APPARATUS |
|---|---|---|
| 1 | (INSERTION OF NON USE) | INITIALIZE DISC AND PRODUCE SYSTEM AREA |
| 2 | RESERVE TRACK<br>NUMBER OF SECTORS | RESERVE FIRST TRACK AND UPDATE AND RECORD RECORD STATUS CONTROL DATA |
| 3 | RESERVE TRACK<br>NUMBER OF SECTORS | RESERVE SECOND TRACK AND UPDATE AND RECORD RECORD STATUS CONTROL DATA |
| 4 | READ TRACK INFORMATION | CALCULATE NEXT WRITABLE LOGICAL ADDRESS OF INVISIBLE TRACK AND REPLY IT TO HOST APPARATUS |
| 5 | WRITE<br>VIDEO OBJECT FILE DATA | RECORD VIDEO DATA IN INVISIBLE TRACK AND STORE RECORD STATUS CONTROL DATA IN RAM |
| 6 | SYNCHRONIZE CACHE<br>(END OF RECORD OF VIDEO DATA) | RECORD NON-OUTPUTTED DATA OF BUFFER AND UPDATE AND RECORD RAM RECORD STATUS CONTROL DATA |
| 7 | WRITE<br>VIDEO TITLE DATA BACK-UP FILE DATA | RECORD VIDEO TITLE DATA BACK-UP FILE DATA AND STORE AND UPDATE RAM RECORD STATUS CONTROL DATA |
| 8 | SYNCHRONIZE CACHE | RECORD NON-OUTPUTTED DATA OF BUFFER AND UPDATE AND RECORD RECORD STATUS CONTROL DATA |
| 9 | CLOSE TRACK<br>INVISIBLE TRACK | CLOSE INVISIBLE TACK AND UPDATE AND RECORD RECORD STATUS CONTROL DATA |
| 10 | READ TRACK INFORMATION | CALCULATE WRITABLE ADDRESS OF SECOND TRACK |
| 11 | WRITE<br>VIDEO TITLE DATA FILE DATA | RECORD VIDEO TITLE DATA FILE DATA AND STORE AND UPDATE RECORD STATUS CONTROL DATA IN RAM |
| 12 | SYNCHRONIZE CACHE | RECORD NON-OUTPUTTED DATA OF BUFFER AND UPDATE AND RECORD RAM RECORD STATUS CONTROL DATA |
| 13 | CLOSE TRACK<br>SECOND TRACK | CLOSE SECOND TRACK AND UPDATE AND RECORD RECORD STATUS CONTROL DATA |
| 14 | READ TRACK INFORMATION | CALCULATE WRITABLE ADDRESS OF FIRST TRACK |
| 15 | WRITE<br>FILE SYSTEM DATA AND VIDE MANAGER FILE GROUP | RECORD FILE SYSTEM AND VIDE MANAGER FILE AND STORE AND UPDATE RECORD STATUS CONTROL DATA IN RAM |
| 16 | SYNCHRONIZE CACHE | RECORD NON-OUTPUTTED DATA OF BUFFER AND UPDATE AND RECORD RAM RECORD STATUS CONTROL DATA |
| 17 | CLOSE TRACK<br>FIRST TRACK | CLOSE FIRST TRACK AND UPDATE AND RECORD RECORD STATUS CONTROL DATA |
| 18 | CLOSE TRACK | CLOSE DISC |

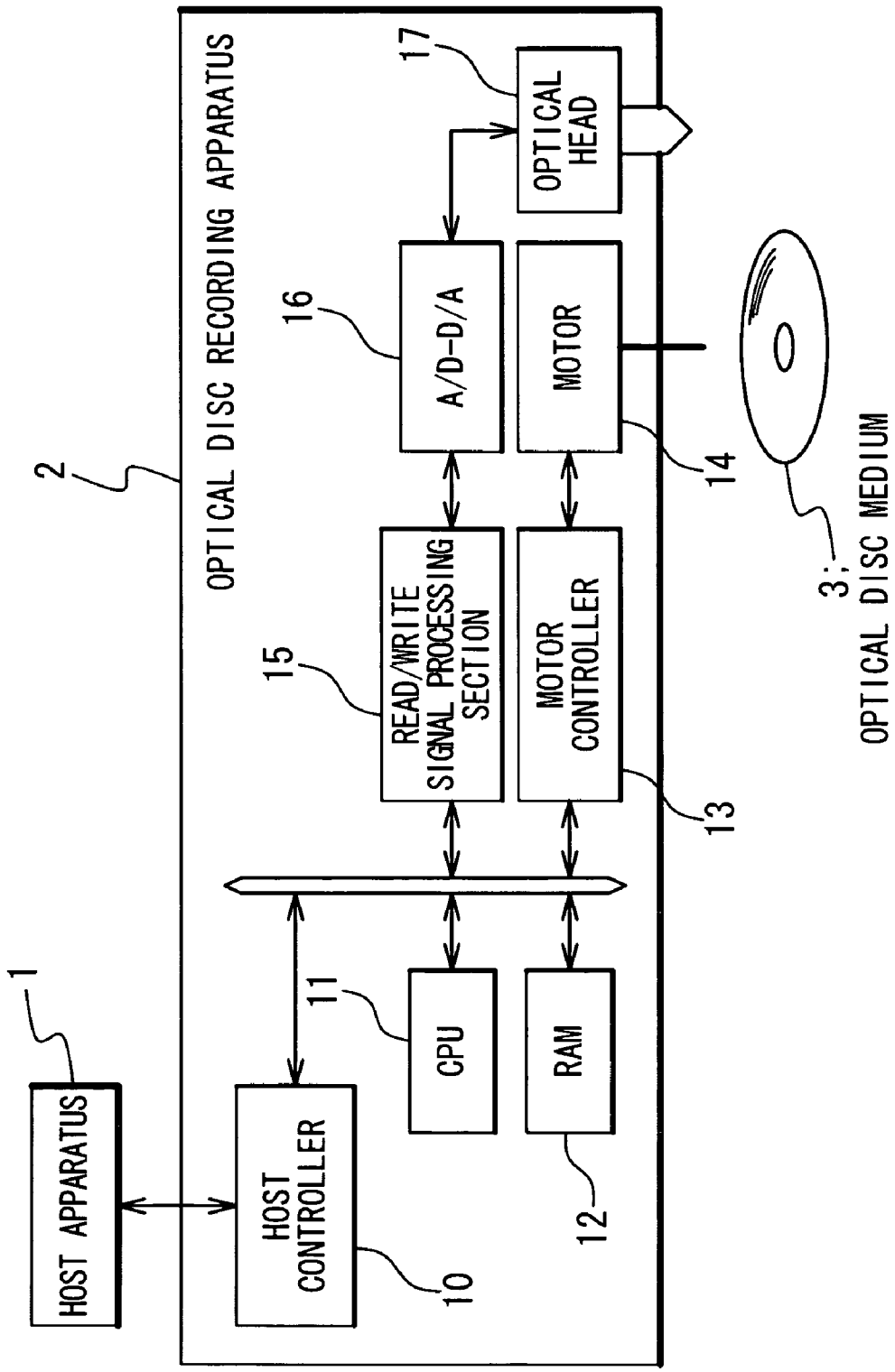

Fig. 6 PRIOR ART

| SECTOR NO. | FIELD NO. | RECORDED DATA |
|---|---|---|
| 0 | | LINK LOSS AREA |
| 1 | FIELD 0 | COMMON DATA |
| 2 | FIELD 1 | MEDIA POWER ADJUSTMENT DATA |
| 3 | FIELD 2 | USER DATA |
| 4 | FIELD 3 | SESSION DATA |
| 5 | FIELD 4 | TRACK CONTROL DATA 25 |
| 6-13 | FIELD 5-12 | TRACK CONTROL DATA 26 |
| 14-15 | FIELD 13-14 | RESERVED AREA |

Fig. 7

| SECTOR NO. | FIELD NO. | RECORDED DATA |
|---|---|---|
| 0 | | LINK LOSS AREA |
| 1 | FIELD 0 | COMMON DATA |
| 2 | FIELD 1 | MEDIA POWER ADJUSTMENT DATA |
| 3 | FIELD 2 | USER DATA |
| 4 | FIELD 3 | SESSION DATA |
| 5 | FIELD 4 | TRACK CONTROL DATA 30 |
| 6-13 | FIELD 5-12 | TRACK CONTROL DATA 26 |
| 14-15 | FIELD 13-14 | RESERVED AREA |

Fig. 8

| START BYTE POSITION | NUMBER OF BYTES | RECORDED DATA |
|---|---|---|
| 0 | 2 | INVISIBLE TRACK NO. |
| 2 | 2 | FIRST TRACK NO. |
| 4 | 2 | SECOND TRACK NO. |
| 6 | 2 | CONTROL DATA RECORD AREA TRACK NO. 31 |
| 8 | 8 | RESERVED AREA |
| 16 | 4 | TRACK #1 START ADDRESS |
| 20 | 4 | TRACK #1 LAST RECORD ADDRESS |
| 24 | 4 | TRACK #2 START ADDRESS |
| 28 | 4 | TRACK #2 LAST RECORD ADDRESS |
| 8+8×n | 4 | TRACK #n START ADDRESS |
| 12+8×n | 4 | TRACK #n LAST RECORD ADDRESS |
| 2040 | 4 | TRACK #254 START ADDRESS |
| 2044 | 4 | TRACK #254 LAST RECORD ADDRESS |

Fig. 9

| START BYTE POSITION | NUMBER OF BYTES | RECORDED DATA |
|---|---|---|
| 0 | 2 | INVISIBLE TRACK NO. |
| 2 | 2 | FIRST TRACK NO. |
| 4 | 2 | SECOND TRACK NO. |
| 6 | 2 | FIRST CONTROL DATA RECORD AREA TRACK NO. 38 |
| 8 | 2 | SECOND CONTROL DATA RECORD AREA TRACK NO. 39 |
| 10 | 6 | RESERVED AREA |
| 16 | 4 | TRACK #1 START ADDRESS |
| 20 | 4 | TRACK #1 LAST RECORD ADDRESS |
| 24 | 4 | TRACK #2 START ADDRESS |
| 28 | 4 | TRACK #2 LAST RECORD ADDRESS |
| 8+8×n | 4 | TRACK #n START ADDRESS |
| 12+8×n | 4 | TRACK #n LAST RECORD ADDRESS |
| 2040 | 4 | TRACK #254 START ADDRESS |
| 2044 | 4 | TRACK #254 LAST RECORD ADDRESS |

Fig. 10

| SECTOR NO. | FIELD NO. | RECORDED DATA |
|---|---|---|
| 0 | | LINK LOSS AREA |
| 1 | FIELD 0 | COMMON DATA |
| 2 | FIELD 1 | MEDIA POWER ADJUSTMENT DATA |
| 3 | FIELD 2 | USER DATA |
| 4 | FIELD 3 | SESSION DATA |
| 5 | FIELD 4 | TRACK CONTROL DATA 25 |
| 6-13 | FIELD 5-12 | TRACK CONTROL DATA 26 |
| 14 | FIELD 13 | RESERVED AREA |
| 15 | FIELD 14 | CONTROL DATA RECORD AREA DATA 40 |

Fig. 11

| START BYTE POSITION | NUMBER OF BYTES | RECORDED DATA |
|---|---|---|
| 0 | 2 | NUMBER OF EXTENDED CONTROL DATA RECORD AREAS |
| 2 | 14 | RESERVED AREA |
| 16 | 4 | CONTROL DATA RECORD AREA #1 START ADDRESS |
| 20 | 4 | CONTROL DATA RECORD AREA #1 END ADDRESS |
| 24 | 4 | CONTROL DATA RECORD AREA #1 LAST RECORD ADDRESS |
| 28 | 4 | CONTROL DATA RECORD AREA #2 START ADDRESS |
| 32 | 4 | CONTROL DATA RECORD AREA #2 END ADDRESS |
| 36 | 4 | CONTROL DATA RECORD AREA #2 LAST RECORD ADDRESS |
| 2032 | 4 | CONTROL DATA RECORD AREA #169 START ADDRESS |
| 2036 | 4 | CONTROL DATA RECORD AREA #169 END ADDRESS |
| 2040 | 4 | CONTROL DATA RECORD AREA #169 LAST RECORD ADDRESS |
| 2044 | 4 | RESERVED AREA |

Fig. 12

| SECTOR NO. | FIELD NO. | RECORDED DATA |
|---|---|---|
| 0 | | LINK LOSS AREA |
| 1 | FIELD 0 | COMMON DATA |
| 2 | FIELD 1 | MEDIA POWER ADJUSTMENT DATA |
| 3 | FIELD 2 | USER DATA |
| 4 | FIELD 3 | SESSION DATA |
| 5 | FIELD 4 | TRACK CONTROL DATA 30 |
| 6-13 | FIELD 5-12 | TRACK CONTROL DATA 26 |
| 14 | FIELD 13 | RESERVED AREA |
| 15 | FIELD 14 | CONTROL DATA RECORD AREA DATA 40 |

Fig. 13

| SECTOR NO. | FIELD NO. | RECORDED DATA |
|---|---|---|
| 0 | | LINK LOSS AREA |
| 1 | FIELD 0 | COMMON DATA |
| 2 | FIELD 1 | MEDIA POWER ADJUSTMENT DATA |
| 3 | FIELD 2 | USER DATA |
| 4 | FIELD 3 | SESSION DATA |
| 5 | FIELD 4 | TRACK CONTROL DATA 30 |
| 6-13 | FIELD 5-12 | TRACK CONTROL DATA 26 |
| 14 | FIELD 13 | RESERVED AREA |
| 15 | FIELD 14 | CONTROL DATA RECORD AREA DATA 60 |

Fig. 14

| START BYTE POSITION | NUMBER OF BYTES | RECORDED DATA |
|---|---|---|
| 0 | 2 | NUMBER OF EXTENDED CONTROL DATA RECORD AREAS |
| 2 | 14 | RESERVED AREA |
| 16 | 2 | CONTROL DATA RECORD AREA #1 TRACK NO. |
| 18 | 2 | CONTROL DATA RECORD AREA #2 TRACK NO. |
| 20 | 2 | CONTROL DATA RECORD AREA #3 TRACK NO. |
| 2046 | 2 | CONTROL DATA RECORD AREA #1016 TRACK NO. |

Fig. 15

| BYTE POSITION | BIT 7 | BIT 6 | BIT 5 | BIT 4 | BIT 3 | BIT 2 | BIT 1 | BIT 0 |
|---|---|---|---|---|---|---|---|---|
| 0 | DISC INFORMATION LENGTH ||||||||
| 1 | |||||||| 
| 2 | RESERVED ||| CONTROL DATA RECORD AREA FLAG 70 | ERASABLE STATUS OF SESSION || DISC STATUS ||
| 3 | NUMBER OF FIRST TRACK ON DSC ||||||||
| 4 | NUMBER OF SESSIONS (LSB) ||||||||
| 5 | FIRST TRACK NUMBER IN LAST SESSION (LSB) ||||||||
| 6 | LAST TRACK NUMBER IN LAST SESSION (LSB) ||||||||
| 7 | DID_V | DBC_V | URU | RESERVED ||| DBit | BG FORMAT STATUS |
| 8 | DISC TYPE ||||||||
| 9 | NUMBER OF SESSIONS (MSB) ||||||||
| 10 | FIRST TRACK NUMBER IN LAST SESSION (MSB) ||||||||
| 11 | LAST TRACK NUMBER IN LAST SESSION (MSB) ||||||||
| 12-15 | DISC IDENTIFICATION ||||||||
| 16-19 | LAST SESSION LEAD-IN START TIME (HMSF) ||||||||
| 20-23 | LAST POSSIBLE START TIME ||||||||
| 24-31 | DISC BAR CODE ||||||||
| 32 | NUMBER OF TIMES 71 OF EXTENSION OF CONTROL DATA RECORD AREA IN DATA AREA ||||||||
| 33 | NUMBER OF OPC TABLE ENTRY ||||||||
| 34~n | ENTRIES OF OPC TABLE ||||||||

Fig. 16

| BYTE POSITION | BIT 7 | BIT 6 | BIT 5 | BIT 4 | BIT 3 | BIT 2 | BIT 1 | BIT 0 |
|---|---|---|---|---|---|---|---|---|
| 0 | | | | | | | | |
| 1 | DATA LENGTH | | | | | | | |
| 2 | NUMBER OF SESSIONS (LSB) | | | | | | | |
| 3 | SESSION NUMBER (LSB) | | | | | | | |
| 4 | RESERVED | | | | | | | |
| 5 | RESERVED | CONTROL DATA RECORD AREA FLAG 70 | DAMAGE | COPY | TRACK MODE | | | |
| 6 | RT | BLANK | PACKET/Inc | FP | DATA MODE | | | |
| 7 | RESERVED | | | | | | LRA_V | NWA_V |
| 8-11 | TRACK START ADDRESS | | | | | | | |
| 12-15 | NEXT WRITABLE ADDRESS | | | | | | | |
| 16-19 | FREE BLOCKS | | | | | | | |
| 20-23 | FIXED PACKET SIZE/BLOCKING FACTOR | | | | | | | |
| 24-27 | TRACK SIZE | | | | | | | |
| 28-31 | LAST RECORDED ADDRESS | | | | | | | |
| 32 | TRACK NUMBER (MSB) | | | | | | | |
| 33 | SESSION NUMBER (MSB) | | | | | | | |
| 34-35 | RESERVED | | | | | | | |
| 36 | READ COMPATIBILITY LBA | | | | | | | |

Fig. 17

| BYTE POSITION | BIT 7 | BIT 6 | BIT 5 | BIT 4 | BIT 3 | BIT 2 | BIT 1 | BIT 0 |
|---|---|---|---|---|---|---|---|---|
| 0 | RESERVE TRACK COMMAND = 53h | | | | | | | |
| 1 | RESERVED | | | | | | | CONTROL DATA RECORD AREA FLAG 70 |
| 2 | 00h | | | | | | | |
| 3 | 00h | | | | | | | |
| 4 | 00h | | | | | | | |
| 5-8 | NUMBER OF SECTORS RESERVED FOR CONTROL DATA RECORD AREA 72 | | | | | | | |
| 9 | CONTROL BYTE | | | | | | | |

Fig. 18

| BYTE POSITION | BIT 7 | BIT 6 | BIT 5 | BIT 4 | BIT 3 | BIT 2 | BIT 1 | BIT 0 |
|---|---|---|---|---|---|---|---|---|
| 0 | CLOS TRACK COMMAND = 5Bh ||||||||
| 1 | RESERVED |||||||IMMED |
| 2 | RESERVED ||||EXTENSION PERMITTING FLAG 80 OF CONTROL DATA RECORD AREA FLAG | CODE FUNCTION |||
| 3 | RESERVED ||||||||
| 4-5 | TRACK NUMBER ||||||||
| 6-8 | RESERVED ||||||||
| 9 | CONTROL BYTE ||||||||

PRIOR ART

Fig. 19

| NO. | TRACK NO. OF OPTICAL DISC RECORDING APPARATUS 2 | CONTROL DATA RECORD AREA ON VISIBLE TRACK | CONTROL DATA RECORD AREA ON INVISIBLE TRACK |
|---|---|---|---|
| 1 | DATA TRACK #1 | DATA TRACK #1 | DATA TRACK #1 |
| 2 | DATA TRACK #2 | DATA TRACK #2 | DATA TRACK #2 |
| 3 | CONTROL DATA RECORD AREA #1 | CONTROL DATA RECORD AREA #1 | DATA TRACK #3 |
| 4 | DATA TRACK #3 | DATA TRACK #3 | |

OPTICAL DISC RECORDING SYSTEM

CROSS REFERENCE TO RELATED APPLICATIONS

This patent application relates to a pending U.S. patent application Ser. No. 11/111,758, filed on Apr. 22, 2005 entitled "OPTICAL DISC MEDIUM, OPTICAL DISC APPARATUS USING THE SAME, AND DATA RECORDING METHOD IN THE SAME ", and claiming a priority based on Japanese patent application No. 2004-129085 which was filed on Apr. 23, 2004 by Yutaka YAMANAKA, Shigeru SHIMONOU, Tatsunori IDE, Hideki TAKAHASHI, Akihito OGAWA and Yutaka KASHIHARA. The contents of the pending U.S. patent application Ser. No. 11/111,758 are herein incorporated by reference.

Also, this patent application relates to pending U.S. patent application Ser. No. 11/111,767, filed on Apr. 22, 2005, entitled "OPTICAL DISC MEDIUM, OPTICAL DISC APPARATUS USING THE SAME, AND DATA RECORDING METHOD ON THE SAME", and claiming a priority based on Japanese patent application No. 2004-129087 which was filed on Apr. 23, 2004 by Yutaka YAMANAIKA, Shigeru SHIMONOU, Tatsunori IDE, Hideki TAKAHASHI, Akihito OGAWA and Yutaka KASHIHARA. The contents of the pending U.S. patent application Ser. No. 11/111,767 are herein incorporated by reference.

BACKGROUND OF THE INVENTION

1. Field of the Invention

The present invention relates to an optical disc medium, an optical disc recording apparatus, and a control method of the same, and especially relates to a write once type optical disc medium, an optical disc recording apparatus to record and reproduce data in the optical disc medium and a control method of the same.

2. Description of the Related Art

A first conventional example of a write once optical disc medium and a second conventional example of a conventional optical disc apparatus are disclosed in Japanese Laid Open Patent Application (JP-P2000-504463A) and U.S. Pat. No. (5,701,281). According to the first conventional example, a writing apparatus writes a data block in a track pattern on a writable record medium. This writing apparatus has a writing unit and a positioning section. The writing unit writes a mark indicating the data block in an area of the record carrier through the electromagnetic radiation beam. The positioning section positions the writing unit on the record carrier based on the track structure showing the track pattern. The writing apparatus also has a status section to generate a status data, which indicates that a write operation is carried out in at least one area of the record carrier. This status data extends from a start position of the track pattern area for the data block to be written, and has an initial area data showing an initial area into which data is written without any interruption.

According to the second conventional example, an optical disc apparatus uses an optical disc that has a zone border unused area and a buffer area as an unused area, and a test area in each user band of a user area. The optical disc apparatus includes a SCSI controller, a head, a control unit, a control parameter data edit unit, a random-access memory, a control parameter writing unit, and a control parameter reading unit. The SCSI controller is connected with a host apparatus and exchanges data with the host apparatus. The head writes or reads the data into or from an optical disc. The control unit controls the writing and reading operations of the data and controls an entire operation of the optical disc apparatus. The control parameter data edit unit edits a control parameter data to have a predetermined format. The random-access memory stores the control parameter data edited by the control parameter data edit unit. The control parameter writing unit writes the control parameter data stored in the random-access memory in an unused area of the optical disc through the head, when the optical disc is pulled out from the optical disc apparatus. The control parameter reading unit reads the control parameter data written in the unused area of the optical disc through the head, when the optical disc is inserted in the optical disc apparatus.

As shown FIG. 3, an optical disc recording system includes a host apparatus 1, an optical disc recording apparatus 2, and an optical disc medium 3. The host apparatus 1 is exemplified by a personal computer (PC). In built-in devices such as DVD (Digital Versatile Disc) recorders, the host apparatus 1 is equivalent to a dominant system to control an entire system. The optical disc recording apparatus 2 records data in the optical disc medium 3 such as the DVD-R medium under an instruction from the host apparatus 1.

The specification for exchange of a command and a status between the host apparatus 1 and the optical disc apparatus 2 is described in ANSI T10/1545-D: "INFORMATION TECHNOLOGY—Multi-Media Commands-4 (MMC-4)" as a third conventional example. The host apparatus 1 exchanges the command and status with the optical disc recording apparatus 2 by using a packet command shown in the third conventional example. In the present invention, the description is given by using the following MMC-4 commands defined in the third conventional example.

(1) A Read (10) command is a command used to read a data from the optical disc recording apparatus 2 for the specified number of sectors from a certain logical address.

(2) A Write (10) command or the a Write (12) command is a command used to read a data from the optical disc recording apparatus 2 for a specified number of sectors from a certain logical address.

(3) A Synchronize Cache command is a command used to make the optical disc recording apparatus 2 to data stored in a write buffer memory of the recording apparatus 2 into the optical disc medium 3.

(4) A Read Disc Information command is a command used to acquire the number of tracks or sessions of the optical disc medium 3, a flag indicating whether the optical disc medium 3 is erasable, and a record status of the optical disc medium 3.

(5) A Read Track Information command is a command used to acquire a start logical address of a certain track or session of the optical disc medium 3, a next writable logical address, and status of tracks and sessions.

(6) A Reserve Track command is a command used to reserve a logical address area containing a certain quantity of sectors as a track.

(7) A Close Track command is a command used to bury all the writable logical address areas of a certain track with dummy data.

(8) A Read DVD Structure command and A Send DVD Structure command are commands used to read and set data arranged in a system area, which cannot be accessed through the Read (10) and the Write (10) command.

(9) A Request Sense command is a command issued for the host apparatus to acquire the status of the optical disc recording apparatus. This command is issued when the optical disc recording apparatus completes a command, and when the optical disc recording apparatus transmits data to be notified to the host apparatus when the status in the optical disc recording apparatus is changed.

As a large capacity of optical disc medium of the write once type, the DVD-R standard is known which is shown in ISO/IEC 20563 "80 nm (1.23 Gbytes per side) and 120 nm (3.95 Gbytes per side)-recordable disc", FIG. 1 shows a physical data arrangement of the DVD-R medium. The optical disc medium 3 has a control data record area 130, a lead-in area 131, a data area 138, and a lead-out area 139 in the order from the inner side. The control data record area 130 and the lead-in area 131 are referred to as a system area, in which data to control the optical disc medium 3 is recorded. Therefore, the system area is controlled so that the host apparatus 1 cannot access directly. The control data record area 130 is an area where data for record management on a recording operation of data in the data area is recorded. The data for the record management is referred to as a record status management data. The data area 138 is an area of the optical disc medium 3 where user data is recorded. The lead-out area 139 indicates an end of the record area of the optical disc medium 3.

These areas are managed every sector of 2048 bytes to which a series of numbers (addresses) is given. Referring to FIG. 1 "h" is put on the end of the address so that the address of each area is described in a hexadecimal notation. The optical disc medium 3 is initialized by the optical disc recording apparatus 2 prior to a data record operation. Through the initialization, the control data record area 130 and the lead-in area 131 are arranged in the area up to the physical address 30000h, and the data area is arranged from the physical address 30000h. In order to prevent the host apparatus from accessing this area up to the physical address 30000h, the physical address 30000h is defined as a logical address 0h normally. Also, the host apparatus 1 accesses the optical disc medium 3 by using the logical address. Therefore, the host apparatus 1 cannot access the system area arranged inside the data area 138. However, the commands such as a Read Disc Information command, a Read DVD Structure command, and a Send DVD Structure command are prepared so that the host apparatus can use a part of these data. Such the command is provided in the ANSI MMC-4 standard described in the third conventional example.

The logical addresses on the record of data in the write-once optical disc should be consecutive due to the constraint of a consecutive record. Therefore, the optical disc recording apparatus 2 manages the data area by dividing the data area into small areas refereed to as a logical track. Then, the optical disc recording apparatus 2 consecutively record the data in the logical track. Thus, the constraint of the consecutive record is met. In the DVD-R medium, it is ruled that maximum three logical tracks can be managed at a same time. The logical tracks are respectively referred to as a first track, a second track, and an invisible track. The invisible track is a logical track on the outermost side of the disc and an end area of the invisible track is not determined.

These logical tracks are areas obtained by separating a logical address space of the data area 138 in the optical disc medium 3 to which the host apparatus 1 can access. Therefore, these logical tracks are different from a physical track configured from a guide groove of the optical disc medium 3 for an optical head and recorded pit strings. In the present invention, the record of the user data and the record status management data is managed by controlling the logical track. Therefore, the logical track is simply referred to as a track in the following description. Moreover, the optical disc recording apparatus 2 can generate a plurality of logical volumes, as virtual disc spaces, on the write-once optical disc 3. Then, each of the logical volumes can be managed as a session.

A recording operation in the DVD-R medium with DVD-Video format will be described below, as an example of using three logical tracks of the DVD-R medium.

First, a file configuration of the DVD-Video will be described. In the DVD-Video, a file system data, a video manager file group, a single or plural video title file groups are arranged in ascending order of the logical address of the optical disc medium. The video manager file group is configured of three files of a video manager data file, a video manager object file and a video manager data backup file. The video manager object file may be omitted. Each video title file group is configured of a video title data file, a video title object file, and a video title data backup file.

Referring to FIG. 2, the ANSI MMC-4 commands exchanged between the host apparatus 1 and the optical disc recording apparatus 2 and operations started based on the commands will be described.

1. When an unused optical disc medium 3 is inserted into the optical disc recording apparatus 2, the optical disc recording apparatus 2 determines a physical media type and initializes the optical disc medium 3. Thus, a system area including a first control data record area and a data area are set in the optical disc medium 3, and necessary physics and logical data are recorded in the system area.

2. The host apparatus 1 issues the Reserve Track command to reserve a track where the file system and the video manager data file are recorded. Receiving the Reserve Track command, the optical disc recording apparatus 2 reserves an area for the number of reservation sectors defined by an argument of the Reserve Track command as one track, and then updates the record status control data in the control data record area of the optical disc medium 3.

3. Subsequently, the host apparatus 1 issues the Reserve Track command to reserve the record area for the video title data file. The optical disc recording apparatus 2 reserves an area for the number of the sectors specified based on the Reserve Track command as a second track. Then, the optical disc recording apparatus 2 updates the record status control data and records it in the control data record area of the optical disc medium 3.

4. The host apparatus 1 issues the Read Track Information command to the optical disc recording apparatus 2. Receiving the Read Track Information command, the optical disc recording apparatus 2 calculates a writable logical address following a track number specified based on the command, and replies the host apparatus. The host apparatus 1 acquires a recordable address (Next Writable Address) of the invisible track as a command reply value.

5. The host apparatus 1 outputs a video object file data of a first title to the optical disc recording apparatus 2 by using the Write (10) command. Receiving the Write (10) command, the optical disc recording apparatus 2 records the data for the number of write sectors from a record start logical address in the optical disc medium 3 based on the command. The optical disc recording apparatus 2 records the record status control data in a RAM using a semiconductor memory, and the record status control data is updated for every command.

6. The host apparatus 1 issues the Synchronize Cache command to the optical disc recording apparatus 2, to end the recording operation of the first title. The optical disc recording apparatus 2 records an un-outputted record data remained in a write buffer memory therein to the optical disc medium 3. The record status control data stored in the RAM in the above step 5 is updated, and the optical disc recording apparatus 2 records the record status control data in the control data record area of the optical disc medium 3.

7. The host apparatus 1 outputs the video title data backup file data to the optical disc recording apparatus 2 by using the Write (10) command. Receiving the Write (10) command, the optical disc recording apparatus 2 records the data for the number of the write sectors from the record start logical address in the optical disc medium 3. Moreover, the optical disc recording apparatus 2 stores the record status control data in the RAM.

8. The host apparatus 1 issues the Synchronize Cache command to the optical disc recording apparatus 2. The optical disc recording apparatus 2 records the un-outputted record data remained in the write buffer memory in the devices in the optical disc medium 3. The record status control data stored in the RAM in the mentioned step 7 is updated, and the host apparatus 1 records the data in the control data record area of the optical disc medium 3.

9. The host apparatus 1 issues the Close Track command to the optical disc recording apparatus 2. The optical disc recording apparatus 2 carries out n end process of the invisible track. In order to set the following recordable area, the optical disc recording apparatus 2 generates a new invisible track following the invisible track to which the end process is carried out. Moreover, the optical disc recording apparatus 2 updates the record status control data for the invisible track after the end process and the invisible track newly generated, and then records the data in the control data record area of the optical disc medium 3.

10. The host apparatus 1 issues the Read Track Information command to the optical disc recording apparatus 2. The optical disc recording apparatus 2 calculates a writable logical address following the track number specified based on an argument of the Read Track In formation command, and replies it to the host apparatus 1. The host apparatus 1 acquires the writable address following the track reserved in the above step 3 as a command replay value.

11. The host apparatus 1 issues the Write (10) command and sends the video title data file data to the optical disc recording apparatus 2. Receiving the Write (10) command, the optical disc recording apparatus 2 records the video title data file data for the number of the write sectors from the record start logical address in the optical disc medium 3 in response to the command, and stores the record status control data in the RAM.

12. The host apparatus 1 issues the Synchronize Cache command to the optical disc recording apparatus 2. The optical disc recording apparatus 2 records the un-outputted record data remained in the buffer memory to the optical disc medium 3. The optical disc recording apparatus 2 updates the record status control data stored in the RAM in the above step 11, and records the record status control data in the control data record area of the optical disc medium 3.

13. In order to close the second track, the host apparatus 1 issues the Close Track command to the optical disc recording apparatus 2. The optical disc recording apparatus 2 carries out the end process of the second track, and updates the record status control data, and records the record status control data in the control data record area in the optical disc medium 3.

14. The host apparatus 1 issues the Read Track Information command to the optical disc recording apparatus 2. The optical disc recording apparatus 2 calculates a writable logical address following the track number given based on an argument of the Read Track In formation command, and replies it to the host apparatus 1. The host apparatus 1 acquires the writable address following the track reserved in the above step 2 as a command replay value.

15. The host apparatus 1 issues the Write (10) command to the optical disc recording apparatus 2 in order to write a file system data and a video manager file group. Receiving the Write (10) command, the optical disc recording apparatus 2 records the data for the number of the write sectors from the record start logical address in the optical disc medium 3 according to the command. The optical disc recording apparatus 2 records the record status control data in the RAM.

16. The host apparatus 1 issues the Synchronize Cache command to the optical disc recording apparatus. The optical disc recording apparatus 2 records the un-outputted record data remained in the buffer memory to the optical disc medium 3. The record status control data stored in the RAM in the above step 15 is updated, and the optical disc recording apparatus 2 records the record status control data in the control data record area of the optical disc medium 3.

17. The host apparatus 1 issues the Close Track command to the optical disc recording apparatus in order to close the first track. The optical disc recording apparatus 2 carries out an end process of the first track, and then, updates and records the record status control data in the control data record area of the optical disc medium 3.

18. The host apparatus 1 issues the Close Track command to the optical disc recording apparatus 2 in order to close the optical disc medium 3. The optical disc recording apparatus 2 carries out a disc close process that is referred to as a finalizing process of the optical disc medium 3. That is, the optical disc recording apparatus 2 adds the lead-in area and the lead-out area to the optical disc medium 3 so that the write-once optical disc 3 can be treated equally to the DVD-ROM.

As mentioned above, the optical disc recording apparatus 2 updates the record status control data for the record management of the optical disc medium 3 when a track is newly reserved by using the Reserve Track command and the series of the recording processes are ended by using the Synchronize Cache and the Close Track command. In addition, when the Write (10) command is issued plural times, the record status control data of optical disc medium 3 is sometimes update in every predetermined number of issuance of the command or every predetermined number of record sectors. In the example of FIG. 2, the record status control data of the optical disc medium 3 is updated in the steps 2, 3, 6, 8, 9, 12, 13, 16 and 17.

In this way, in the conventional optical disc media 3 such as the DVD-R medium, the control data record area 130 for the record management is arranged in the fixed size on the system area that the host apparatus 1 cannot directly access. The record status control data is updated every constant data size when the host apparatus 1 issues the write command consecutively. Also, the record status control data is updated when the host apparatus 1 issues the synchronize cache command to the optical disc recording apparatus 2 or the track close command is ended. Therefore, if small size data are repeatedly recorded, the control data record area 130 is assumed in a short time. Therefore, when the control data record area 130 for the record status control data has entirely used although the data area 138 has a free area, an additional recording operation cannot be carried out to the optical disc medium 3.

Especially, the write-once optical disc using a blue laser has a storage capacity several times or more times as large as the conventional DVD-R medium. Therefore, when the size of data to be recorded is the same as the conventional size of data, there is a possibility that the record status control data overflows from the control data record area in the system area.

In conjunction with the above description, a method of recording information to a write once type information recording medium is disclosed in Japanese Laid Open Patent Application (JP-A-Heisei 6-338139). In this conventional example, the information recording medium has an information record area to record information, a replace information record area used when the record of the information is failed and the information is re-written, and a management information record area to record data for managing a rewrite history. When an unused area is below a predetermined quantity in a record area for a purpose, at least a part of an unused area of a record area for another purpose is allocated as an extension area of the record area for the above purpose.

Also, an optical disc medium is disclosed in Japanese Laid Open Patent Application (JP-P2004-39186A). In this conventional example, a data record area is defined based on a predetermined standard. An extension area is further provided in an inner area from the data record area.

SUMMARY OF THE INVENTION

An object of the present invention is to provide an optical disc recording system that can additionally record data in an optical disc medium if a data area has an unused area, and a optical disc medium used for the same.

Another object of the present invention is to provide an optical disc recording system that can additionally record data in the optical disc medium even if there is no recordable area in the control data record area in the system area, and an optical disc medium used for the same.

In an aspect of the present invention, an optical disc recording system includes a host apparatus configured to issue commands; and an optical disc recording apparatus configured to carry out a process corresponding to each of the commands, and to reply a response data to the command to the host apparatus. The host apparatus issues a record command as one of the commands to record a record data in an optical disc medium, and an optical disc recording apparatus records the record data in a data area in a predetermined format in response to the record command, wherein the optical disc comprises the data area and a first control data record area. The optical disc recording apparatus additionally sets each of second control data record areas in the data area in association with a command from the host apparatus as one of the commands, and a record status control data is recorded in the first or second control data record area to indicate record status of the record data. At least a part of a second control data record area associated data with at least one information related to said additional setting of a second control data recording area is shared by the host apparatus and the optical disc recording apparatus.

Here, the information related to the additional setting preferably includes at least one of a number of the second control data record areas and addresses of the second control data record areas.

Also, a check may be made to determine whether or not a second control data record area is additionally set in the data area each time the record status control data is recorded when a predetermined record time elapses or when the record of the record data is once ended.

Also, when the size of an unused record area remaining in the first control data record area or the second control data record areas is equal to or less than a predetermined threshold, it is preferably determined that the second control data record area should be additionally set in the data area. In this case, the threshold may be equal to or larger than $2*m$, where m is a number of the tracks accessible at a same time, to one of record units of the record data. Also, the optical disc recording apparatus may notify the host apparatus of a fact that it is determined that the second control data record area should be additionally set in the data area.

Also, the optical disc recording apparatus may set a data indicating that the second control data record area is additionally added, in the response data to the command. In this case, preferably, the command is one of a Reserve Track command, a Write (10) command, a Write (12) command, a Synchronize Cache command and a Close Track command which are defined in ANSI MMC-4.

Also, after an invisible track is closed and a termination position thereof is determined, the second control data record area may be additionally set subsequently to the closed invisible track. In this case, the optical disc recording apparatus may receive a close command from the host apparatus to close the invisible track, may additionally set a second control data record area when determining that an area for the record status control data is insufficient to record subsequent data, and may set a data indicating addition of the second control data record area, in the response data to the close command.

Also, the close command may have an extension permission flag to indicate that the host apparatus permits the optical disc recording apparatus to additionally set the second control data record area in the data area. The optical disc recording apparatus additionally sets the second control data record area only when the extension permission flag indicate a permission, and notifies addition of the second control data record area to the host apparatus.

Also, a secure command to secure a track in the data area may have a control data record area flag to specify whether or not the track should be secured for the second control data record area. When determining that an area for the record status control data is insufficient to record subsequent data, the host apparatus issues the secure command to the optical disc recording apparatus subsequent to a close command to close an invisible track. The optical disc recording apparatus additionally secures the second control data record area in the data area in response to the secure command.

Also, the host apparatus may determine whether an area for the record status control data is insufficient to record subsequent data, and issue a secure command to the optical disc recording apparatus to secure the second control data record area in the data area, subsequently to a close commend to close an invisible track. The optical disc recording apparatus additionally secures the second control data record area in the data area in response to the secure command.

Also, the host apparatus may transmit an input/output command to input or output the record status control data in the second control data record area to the optical disc recording apparatus. The optical disc recording apparatus sets a data in the response data to the input/output command to indicate that it is not possible to carry out the input/output of the record status control data in the second control data record area.

Also, the host apparatus may issue a status acquire command to acquire a status of the optical disc to the optical disc recording apparatus. The optical disc recording apparatus sets the second control data record area associated data in the response data to the status acquire command. In this case, the second control data record area associated data may contain at least one of a flag to indicate that the second control data record area exists and a number of the areas which the record status control data is stored in the optical disc medium. Also, the number of the areas in which the record status control data are recorded in the optical disc medium may be a number of the second control data record areas. Also, the number of the areas in which the record status control data are recorded in the optical disc medium may be a number of the first control data record areas and the second control data record areas.

Also, management of a track as the second control data record area may be different from management of a track for the record data. In this case, a field of the record status control data for managing the track as the second control data record area may be different from that of the record status control data for managing the track for the record data.

Also, management of a track as the second control data record area may be same as management of a track for the record data. In this case, a field of the record status control data for managing the track as the second control data record area may be same as that of the record status control data for managing the track for the record data.

Also, the optical disc recording apparatus may notify the host apparatus of a number of tracks for recorded data other than a number of tracks used for the second control data record area. In this case, the host apparatus may issue a status acquire command to acquire a status of the optical disc medium. The optical disc recording apparatus sets a number of the tracks for the recorded data other than a number of the tracks used for the second control data record area in the response data to the status acquire command.

Also, a number of tracks notified from the optical disc recording apparatus to the host apparatus contain a number of the tracks used for the second control data record area. In this case, the host apparatus issues a status acquire command to acquire a status of the optical disc medium. The optical disc recording apparatus sets a number of the tracks used for the second control data record area in the response data to the status acquire command.

Also, the host apparatus issues track data acquire command to acquire a track data. The optical disc recording apparatus sets a data of whether or not a specified track is in the second control data record area, in the response data to the track data acquire command.

BRIEF DESCRIPTION OF THE DRAWINGS

FIG. 1 is a diagram showing a physical data arrangement of a DVD-R medium;

FIG. 2 is a table showing the ANSI MMC-4 commands and operations started based on the commands;

FIG. 3 is a block diagram showing an optical disc recording system of the present invention;

FIG. 6 is a diagram showing a conventional record status control data of a DVD-R;

FIG. 7 is a diagram showing a managing method of a control data record area extended in the data area;

FIG. 8 is a diagram showing a track control data;

FIG. 9 is a diagram showing a method of simultaneously managing two control data record areas provided in two data areas by providing an area to store the first control data record area track number and an area to store the second control data record area track number;

FIG. 10 is a diagram showing a method of managing the control data record area extended to a third data area;

FIG. 11 is a diagram showing the control data record area data containing the number of the control data record areas in the data area;

FIG. 12 is a diagram showing a managing method of the control data record area extended to the data area;

FIG. 13 is a diagram showing a managing method of the control data record area extended to the data area;

FIG. 14 is a diagram showing the control data record area data containing a control data record area number and a truck number of each control data record area;

FIG. 15 is a diagram showing an extension of the response data to the Read Disc Information command;

FIG. 16 is an extension of the response data to the Read Track Information command;

FIG. 17 is a diagram showing a control data record area flag provided in the bit 0 of the first byte of this command to instruct the track reserved by a command to secure as the control data record area;

FIG. 18 is a diagram showing a bit of extension of the control data record area provided in the bit 3 of the second byte of the conventional command packet;

FIG. 19 is a diagram showing a relation between a track in the optical disc recording apparatus and a track in the host apparatus;

DESCRIPTION OF THE PREFERRED EMBODIMENTS

Figure 4:
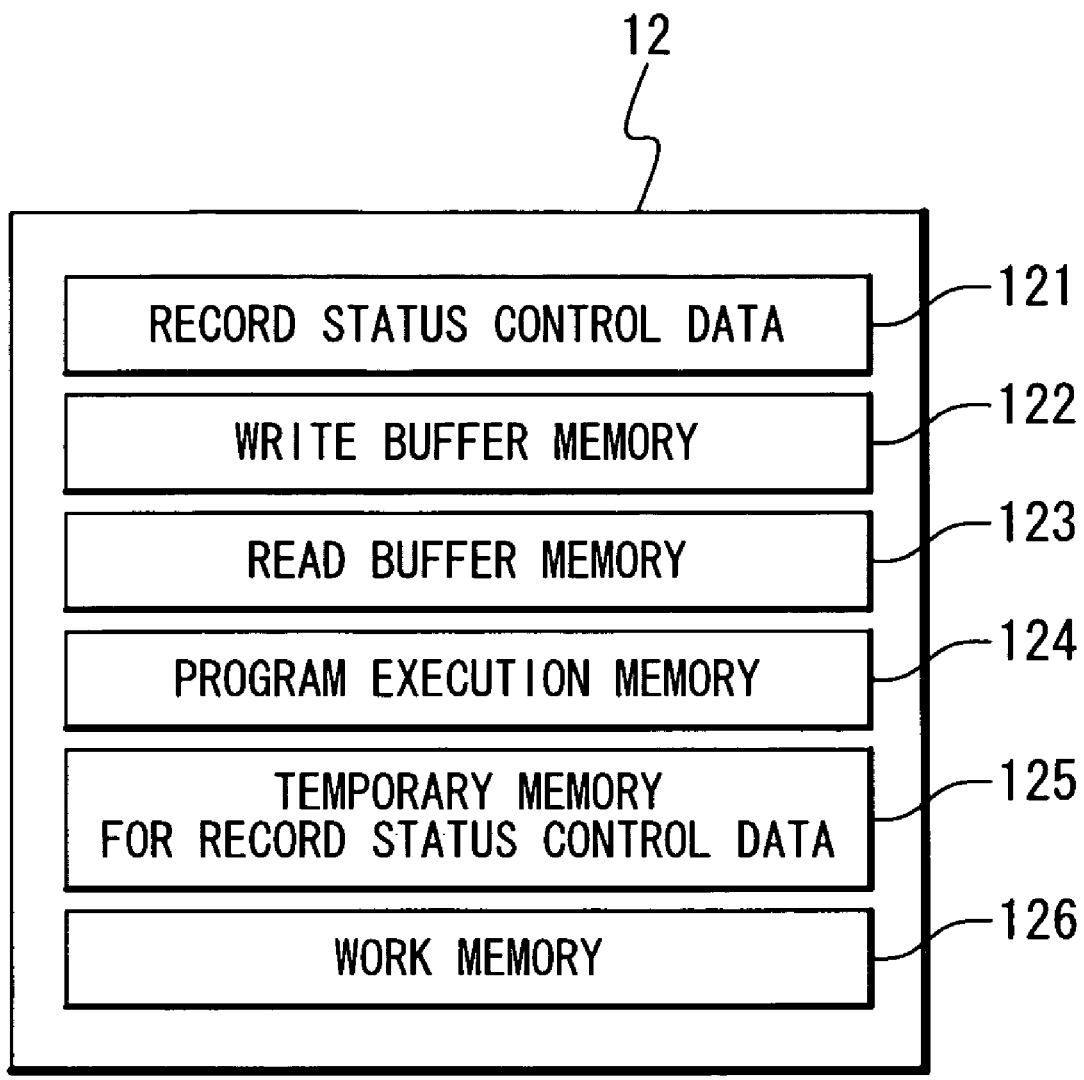
FIG. 4 is a block diagram showing the contents stored in a RAM 12 shown in FIG. 3.

Hereinafter, an optical disc recording system of the present invention will be described with reference to attached drawings.

FIG. 3 shows a configuration of the optical disc recording system of the present invention. The optical disc recording system includes a host apparatus 1, an optical disc recording apparatus 2, and an optical disc medium 3. The host apparatus 1 is exemplified by a personal computer (PC). The host apparatus 1 is exemplified by an upper rank system to control the whole system in case of a built-in apparatus such as a DVD (Digital Versatile Disc) recorder. The optical disc recording apparatus 2 drives the optical disc medium 3, and records data in the optical disc medium 3 in accordance with an instruction or command from the host apparatus 1.

The optical disc recording apparatus 2 includes a host controller 10, a CPU 11, a RAM 12, a motor controller 13, a motor 14, a read/write signal processing section 15, an A/D-D/A converting section 16, and an optical head 17.

The host controller 10 transmits and receives a command and data to and from the host apparatus 1. At this time, as physical interfaces for the transmission and reception, the following interfaces are general: SCSI (Small Computer System Interface), IDE (Integral Device Electronics), USB (Universal Serial Bus), and IEEE 1394 standard interface. In case of the built-in system, an exclusive electrical I/F can be occasionally used. When the host apparatus 1 is a personal computer, the command definition is conformed to ANSI MMC-4 command set shown in the third conventional example. On the other hand, in the built-in system, the command definition often has a so-called vender unique command set that is extended originally based on the MMC-4 command.

The CPU (Central Processing Unit) 11 controls the optical disc recording apparatus 2 entirely, and uses the RAM (Random Access Memory) 12 as a program memory and a work memory. The CPU 11 is connected with the host controller 10, the motor controller 13, and the read/write signal processing section 15 through a bus. The CPU 11 controls each of the sections and exchanges data with the host apparatus 1 through the host controller 10.

The read/write signal processing section 15 carries out buffering, data/channel data modulation that is matched to various types of optical disc media, and addition and calculation of an error correction code. Also, the read/write signal processing section 15 exchanges data with the A/D-D/A (Analog to Digital-Digital to Analog) converting section 16.

The optical head 17 record a signal from the A/D-D/A converting section 16 in the optical disc medium 3, or outputs a signal read out from the optical disc medium 3 to the A/D-D/A converting section 16.

The motor controller 13 controls a rotation of the optical disc medium 3. In case of a CLV (Constant Linear Velocity), the motor controller 13 controls the rotation number of the motor 14 based on the position of the optical head 17 in the redial direction so that the linear velocity becomes constant.

As shown in FIG. 4, the RAM 12 is divided into a record status control data memory 121, a write buffer memory 122, a read buffer memory 123, a program execution memory 124, a temporary record status control data memory 125, and a work memory 126. Also, the RAM 12 is used as a temporary data storage of data necessary for the optical disc recording apparatus 2.

The CPU 11 stores a record status control data of data that is recorded in the optical disc medium 3 in the record status control data memory 121. In case of the recording operation to the optical disc medium of a write once type, the CPU 11 stores the record status control data of the recorded data in the record status control data memory 121 of the RAM 12. When the recording operation of data is ended, the CPU 11 records the stored data in the record status control data memory 121 in the control data record area of the optical disc medium 3, to update a use status of the optical disc medium 3. The latest record status control data recorded in the optical disc medium 3 indicates all records of the optical disc medium 3. A Write command exemplifies the record command of the record status control data. A Synchronize Cache command and a Close Track command exemplify the data record termination command. In the optical disc recording apparatus 2 of the present invention, a variable set is provided in the record status control data memory 121 to manage the management data record area set in the data area.

The write buffer memory 122 is a memory to temporarily store the data to record in the optical disc medium 3. In the optical disc recording apparatus 2, an area of approximately 1 Mbytes in the RAM 12 is assigned to the write buffer memory 122. When the host apparatus 1 instructs the data record to the optical disc recording apparatus 2 by using the Write (10) command, the CPU 11 stores the record data in the write buffer memory 122 and outputs the record data to the optical disc medium 3 through the section 15, A/D-D/A converting section 16, and the optical head 17 in units of data sizes. Such a recording method is general in the optical disc recording apparatus 2. Therefore, even if the host apparatus 1 has ended the recording process, there is a case that the record data remains in the write buffer memory 122 without being recorded in the optical disc medium 3. For this reason, when having ended the recording process, the host apparatus 1 issues the Synchronize Cache command to the CPU 11 through the host controller 10 such that the record data remained in the write buffer memory 122 is recorded in the optical disc medium 3 and the write buffer memory 122 becomes empty.

The read buffer memory 123 is a memory to temporarily store the data read out from the optical disc medium 3. An area of about 1 Mbytes in the RAM 12 is assigned to the read buffer memory 123. When the host apparatus 1 issues the Read command to the optical disc recording apparatus 2, the optical disc recording apparatus 2 reads from the optical disc medium 3 in the read buffer memory 123, read data for a preset number of sectors which is larger than the number of the sectors instructed based on the Read command. When the host apparatus 1 issues the Read command to read out the next data from the optical disc medium 3, the optical disc recording apparatus 2 does not actually read the data from the optical disc medium 3, but outputs the recorded data that has been stored in the read buffer memory 123 to the host apparatus 1. Therefore, the command response time can be shortened.

The program execution memory 124 is a memory that stores a program to control the CPU 11. The temporary record status control data memory 125 is a memory to temporarily store the record status control data to be recorded in the optical disc medium 3 when the optical disc medium 3 cannot record the data. The work memory 126 is a memory to store necessary data for the CPU 11 to execute program and the like.

Figure 5:
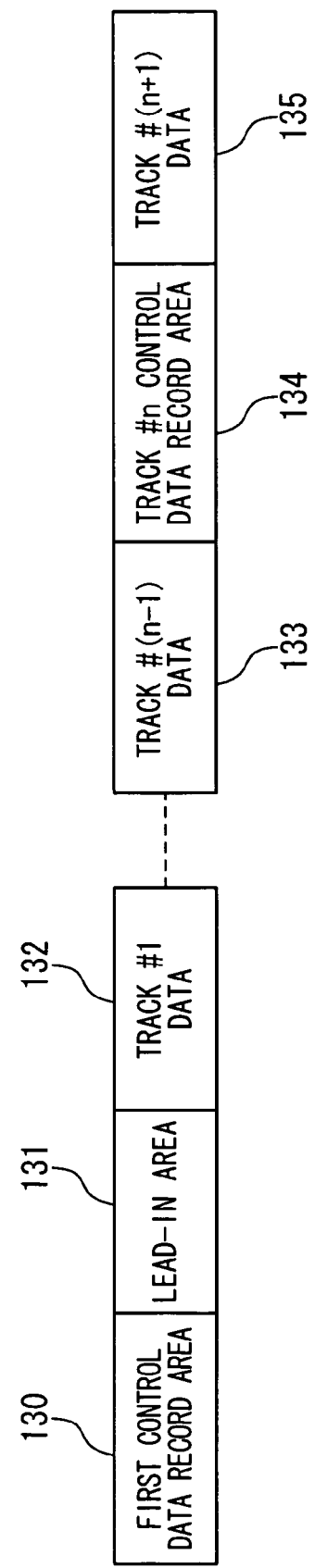
FIG. 5 is a diagram showing a configuration of the optical disc medium of the present invention.

Referring to FIGS. 1 and 5, an arrangement of data in the optical disc medium 3 will be described below. The optical disc medium 3 includes a control data record area 130, a lead-in area 131, a data area 138, and a lead-out area 139 in this order from the inner circumference side of the disc.

The control data record area 130 and the lead-in area 131 are referred to as the system area, in which the data to control or manage the optical disc medium 3 are recorded. The control data record area 130 is an area where the record status control data for the record management is recorded when a data is recorded in the data area 138.

The data area 138 is an area of optical disc medium 3 in which a user data is recorded. The lead-out area 139 indicates the end of the record area of the optical disc medium 3.

These areas are managed in units of areas of 2048 bytes referred to as sectors, to which a series of numbers (addresses) are allocated. The symbol "h" is put on the end of the address in FIG. 1 so that the addresses of these areas are expressed in the hexadecimal notation. Through the initialization before the data recording process to the optical disc recording apparatus 2, the control data record area 130 and the lead-in area 131 are arranged in the area up to a physical address 30000h, and the data area 138 is arranged in the area from the physical address 30000h. The physical address 30000h is defined as a logical address 0h. The host apparatus 1 accesses the optical disc medium 3 by using the logical address. Therefore, the host apparatus 1 cannot access the system area that is in the inner circumference side of the data area 138. However, the Read Disc Information command, a Read DVD Structure command, a Send DVD Structure command, and the like are prepared in ANSI MMC-4 standard described in the third conventional example, so that the host apparatus 1 can use a part of those data.

The logical address of the record data must be consecutive because a write-once optical disc has a constraint of the record to consecutive areas. Therefore, the optical disc recording apparatus 2 manages the data area 138 by dividing the data area 138 into small areas referred to as logical tracks. The optical disc recording apparatus 2 sequentially records data in the tracks. Thus, the constraint of the record to the consecutive areas is met. It is supposed that in the optical disc medium 3, maximum three logical tracks can be managed at a same time. The three tracks are referred to as a first track, a second track, and an invisible track. Here, the invisible track is a logical track which is arranged in the outermost side of the disc, and does not have a predetermined end area.

The logical tracks are areas configured by dividing the logical address space of the data area 138 of the optical disc medium 3 to which the host apparatus 1 can access. Since the length of the track depends on the data to be recorded, the management of the logical track is carried out based on sector addresses. In other words, the logical track is different from a physical track that is configured from a guide groove on the optical disc medium 3 for the optical head 17 and a recorded pit row. In the present invention, the record of the user data and the record status control data are managed by controlling the logical track. Therefore, the logical track is abbreviated to a "track" in the following description. Moreover, the optical disc recording apparatus 2 can produce a plurality of logical volumes as virtual disc spaces on the write-once optical disc 3, so that the optical disc recording apparatus 2 can manage each of the logical volumes as a session.

FIG. 5 shows a configuration of the optical disc medium 3 of the present invention. As shown in FIG. 5, the optical disc medium 3 includes the first control data record area 130, the lead-in area 131 which are arranged in the system area. The optical disc medium 3 further includes the data area 138, in which a track (#1) 132, . . . , a track (#n−1) 133, a track (#n) 134 and a tracks (#n+1) are arranged. The track (#1) 132 to the track (#n−1) 133, and the track (#n+1) are tracks in which the user data are recorded. The track (#n) 134 is used as a control data record area.

The control data record area 134 set in the data area 138 is provided to extend the first control data record area 130. Therefore, the control data record area 134 is necessary to have continuity with the data in the first control data record area 130. For this reason, the control data record area 134 has the following data management structure.

As shown in FIG. 6, the conventional record status control data of the DVD-R (in the third conventional example, table 18) is configured of one ECC block, namely, 16 sectors. Thus, one ECC block is used for every recording operation of the updated record status control data in the optical disc medium 3. A zero sector among the 16 sectors is a link loss area. Field numbers are assigned to first to fifteenth sectors in an ascending order, and storage contents are defined previously.

The link loss area is an area for a gap between the areas and has no data. This area is reserved for compatibility with a conventional optical disc medium 3.

As shown in a table 19 of the third conventional example, a Field 0 is an area where a common data is stored, which is commonly managed in various types of optical disc media. As shown in a table 21 of the third conventional example, a field 1 is an area where a media power data is stored, which indicates recording conditions such as the intensity of the laser light and the like, in the recording operation in the optical disc medium 3. A field 2 is an area which a vender of the optical disc recording apparatus 2 can freely use. As shown in a table 22 of the third conventional example, a field 3 is an area where a session data is stored. Fields 4 to 12 are areas where a track control data is stored such as a start address and an end record address of the generated track. As shown in a table 23 of the third conventional example, the field 4 is also an area to store a track data on the recording operation, and corresponds to a header section of the track control data. As shown in a table 24 of the third conventional example, the fields 5 to 12 are areas to store the track control data that follows the field 4. Fields 13 and 14 are reserved areas.

The track control data 25 stored in the Field 4 is configured from track numbers assigned to the first track, the second track, and the invisible track, a set of a start address and a record end address of each generated track. The start address and the record end address of each generated track are stored from 16-th bite of the field 4 in correspondence to the track number. The track control data 26 is configured of a start address and a record end address of each track from the track number following the track control data 25.

According to the present invention, the conventional record status control data configured as mentioned above is extended to provide an area to store the record status control data in the data area 138. Here, five kinds of conventional extension methods of the record status control data are known.

Referring to FIGS. 7 and 8, a managing method of the control data record area extended in the first data area will be described. As shown in FIG. 7, in the managing method of the control data record area, a track number, which indicates the control data record area extended in the data area, is added to the track control data 25 that is stored in the Field 4 of the record status control data. Then, the track number is changed to a track control data 30.

As shown in FIG. 8, the track control data 30 includes an invisible track number, a first track number, a second track number, a control data record area track number, a reserved area, and start and last record addresses of each track. The invisible track number, the first track number, and the second track number are track numbers of the invisible track, the first track, and the second track, which are set to manage simultaneously. The control data record area track number is a track number of the track set as a control data record area extended into the data area 138. The start address and the last record address of each track are respectively a start address and last record address (sector address) of the logical track set in the data area 138 (sector address). The addresses are stored in the order of the track number. The tracks are sequentially set as the recording process advances, and the start address and the last record address are recorded. The reserved area is an area prepared previously for data extension.

A 2-byte area 31 2-from the sixth byte is an area to record the control data record area track number arranged in the data area, although this area has been used as a reserved area in the conventional DVD-R medium. By providing the area 31, it becomes possible to arrange the control data record area 134 in the data area 138 to store the record status control data in addition to the data tracks 132, 133, 135, . . . to store the user data.

When the control data record area 134 is set in the data area 138, its track number n is stored in the 2-byte area from the sixth byte in the track control data 30. The track control data 30 or the track control data 26 is retrieved based on the track number n. Thus, the stare address and last record address of the control data record area 134 can be acquired.

As mentioned above, in the conventional DVD-R medium, when the control data record area 130 generated in the system area at the initialization has been entirely used, it is not possible to record the user data even if the data area has a unused area. On the other hand, in the present invention, the control data record area 134 is extended to the data area 138, and the record status control data is recorded in the extended area. As a result, it is possible to record the user data if the data area 138 has the unused area.

Moreover, the reserved area from the eighth byte shown in FIG. 8 may be used to record the track number of the control data record area. In this case, it is possible to manage a plurality of the control data record areas. The extension up to maximum 5 areas is possible by using the entire reserved area.

A managing method of the control data record area extended to a second data area is described with reference to FIGS. 7 and 9. In the managing method, two control data record area track numbers are recorded in the track control data 30. In a first managing method of the control data record area extended to the data area, an area can store only one track number indicating the control data record area 134 extended to the data area 138 and is set in the track control data 30. For this reason, it is possible to indicate the control data record area 134 extended to the data area 138, following the first control data record area 130. However, it is not possible to store data indicating the area to be further extended. As a result, it is necessary to reserve a large capacity of the control data record area 134 in the first managing method. In a second managing method, the record status control data is distributed to a plurality of the control data record areas. Thus, the size of each of the control data record areas can be made comparatively small.

In the managing method of the control data record area extended to the second data area, the track control data 30 stored in the field 4 shown in FIG. 7 has two track numbers to indicate the control data record areas as shown in FIG. 9. In FIG. 9, by providing an area 38 to store the first control data record area track number and an area 39 to store the second control data record area track number, it becomes possible to simultaneously manage the control data record areas 134 and 134' provided in two data areas.

The first control data record area track number stored in the area 38 indicates the track number of the control data record area extended to the data area 138. That is to say, the first control data record area track number is a track number of the first control data record area extended to the data area 138 in the record status control data recorded in the first control data record area 130, and is a track number of the control data record area 134 in the record status control data recorded in the control data record area 134 extended to the data area 138.

The second control data record area track number stored in the area 39 is a track number of the control data record area next extended to the data area 138. That is to say, when the second control data record area is not set, the second control data record area track number is not recorded in the record status control data recorded in the first control data record area. The second control data record area track number is a track number of the control data record area 134' to be next used, in the record status control data recorded in the control data record area 134 extended to the data area 138.

The control data record area 134 is not usually extended to the data area 138 immediately after the initialization of the optical disc medium 3. Therefore, the track number stored in the areas 38 and 39 are not yet determined, and the record status control data is recorded in the first control data record area 130 sequentially. When the control data record area 134 is set in the data area 138 to extend the control data record area, the track number of the control data record area 134 is recorded in the control data record area 130 set in the area 38 for the record status control data as the first control data record area track number. At this time, if the second control data record area is not yet set, the area 39 is still unset.

When the recording process further progresses, the record status control data is recorded in the control data record area 134. At this time, the track number of the control data record area 134 is set as the first control data record area track number. Also, the second control data record area track number is not set until the control data record area 134' to be next used is set. When the control data record area 134' to be next used is set, the second control data record area track number is set to the control data record area 134'.

When the areas 38 and 39 are set in this way, and the recording process further progresses, the record status control data is recorded in the control data record area 134'. At this time, the track number of the control data record area 134' is set as the first control data record area track number. Also, the second control data record area track number is not set until the control data record area to be next used is set.

By repeating the above operation, the control data record area 134 can be extended to the data area 138 one after another. Thus, the extended control data record areas are configured to have a list structure.

In the description up to this, the extending method of the control data record area is described, in which the two track numbers of the extended control data record area are managed. However, it is possible to extend the area by another method, in which a flag indicating the setting of the control data record area extended to the data area 138, and the track number of the area are managed.

Next, a method of managing the control data record area extended to a third data area will be described with reference to FIGS. 10 and 11. As shown in FIG. 10, in the method of managing the control data record area extended to the third data area, a control data record area data area 40 is provided in the field 14 besides the track control data areas 25 and 26 in order to manage the data concerning the control data record area extended to the data area 138. The difference from the conventional technique is to provide the control data record area data region 40 in the field 14. Moreover, the third managing method uses sector addresses for the management although the control data record area is managed by using the track number set in the data area 138 in the first and second managing methods.

The control data record area data region 40 is an area where the data concerning the control data record area extended to data area 138 is recorded. As shown in FIG. 11, the control data record area data includes the number of the control data record areas in the data area 138, a start address, an end address and a last record address of each control data record area. A set of the start address, the end address, and the last record addresses of each control data record area can be recorded in the control data record area data region 40 up to 169 sets. It is possible to extend the control data record area provided in the data area 138 up to 169 areas.

The data of the control data record area 134 is added each time the control data record area 134 is provided in the data area 138. When the control data record area 134 is newly added, the start address and the end address of the area are recorded, and the number of the extended control data record areas is updated and recorded. The last record address of the control data record area 134 is updated and recorded each time the record status control data is recorded.

In this way, according to the third management method, the plurality of the control data record areas can be managed or controlled, and the management is carried out based on the address data of each control data record area. Therefore, it is unnecessary to convert the track number into the address, and simplification and speeding-up of the processing can be achieved.

Here, the end address of the control data record area may be acquired by calculating the start address of the control data record area and the start address of each track recorded in the track control data 25 and 26. Therefore, when the CPU 11 in the optical disc recording apparatus 2 is operated in high-speed, the same effect can be achieved even if the end address of the control data record area is not recorded in the control data record area data region 40.

Next, a fourth managing method of the control data record area extended to the data area will be described with reference to FIG. 12. As shown in FIG. 12, the fourth managing method is a method to provide a track control data 30 in the field 4, and control data record area data 40 in the field 14 for the management. As shown in FIG. 11, the control data record area data 40 stores an address of the control data record area 134 extended to the data area 138. Also, as shown in FIG. 8 or 9, the track control data 30 stores the track number of the control data record area 134. Therefore, the control data record area 134 is managed based on the address and the track number in the fourth managing method.

In the track control data 30, it is possible to refer to the track number of the latest control data record area 134. In the control data record area data 40, it is possible to refer to the history of the control data record area. Thus, it is possible to bifurcate the control data record area data 40 and the track control data 30 according to the situation to manage the control data record area 134. In other words, in the fourth managing method of the control data record area extended to the data area, each track recorded in the data area 138 can be managed simultaneously based on the track control data 30, as well as the plurality of the control data record areas provided in the data area can be managed by using the control data record area data 40.

Next, a fifth managing method of the control data record area extended to the data area will be described with reference to FIGS. 13 and 14. The difference between the fourth and the fifth methods is in that the data to be stored in the field 14 is a control data record area data 60 in the fifth method as shown in FIG. 13, while it is the control data record area data 40 in the fourth method.

As shown in FIG. 14, the control data record area data 60 includes a control data record area number and a truck number of each control data record area. The control data record area number indicates the number of the extended control data record areas contained in the data area 138. The track number of each control data record area is the track number of each extended control data record area contained in the data area 138. This track number corresponds to the track number stored in the track control data 30 or 26, and it is possible to refer to the address of each control data record area from the track number of each control data record area. The control data record area data 60 can store the track numbers up to 1016 of the extended control data record areas, and in the fifth managing method, the extended control data record areas up to 1016 areas can be managed or controlled. Therefore, the fifth managing method is effective when a lot of control data record areas are to be managed.

In the above description, the control data record area data 40 or control data record area data 60 has been set in the field 14 of the record status control data. However, the control data record area extended to the data area can be managed if the control data record area data exists in the record status control data. Therefore, a part of the sector whose content is standardized according to the standard of the optical disc medium 3 such as the DVD-R may be changed and an additional sector may be specified and arranged.

Also, the addresses set in the track control data 30, the control data record area data 40, and the control data record area data 60 are usually physical addresses. However, it may be logical addresses since the record data management area extended to the data area 138 is set in the logical address space.

Next, control methods will be described, in both cases that the control data record area is visible and invisible for the host apparatus 1 as the logical track.

As mentioned above, it is possible to extend and set the control data record area 134 in the data area 138. However, since the record status control data recorded in the control data record area 134 is conventionally recorded in the system area, the data is closed and managed in the optical disc recording apparatus 2. Since the control data record area 134 is in the data area 138, the record status control data is treated in the same manner as a usual user data. Also, the record status control data is impossible to be closed and managed in the optical disc recording apparatus 2. Therefore, in order that the record status control data is closed and managed in the optical disc recording apparatus 2 in the access to the control data record area 134 from the host apparatus 1, the conventional interface between the host apparatus 1 and the optical disc recording apparatus 2 is modified.

First, how data concerning the track that is managed in the optical disc recording apparatus 2 is given to the host apparatus 1 will be described. FIG. 19 shows a relation between the track under the control by the optical disc recording apparatus 2 and the track in the light of the host apparatus 1. As shown in FIG. 19, it is supposed that four tracks of a track # 1, a track # 2, a track # 3 and a track # 4 are set in the data area 138 in the optical disc medium 3, the user data are recorded in the track # 1, the track # 2 and the track # 4, and the record status control data is recorded in the track # 3. That is, the track # 1, the track # 2 and the track # 4 are assigned as data tracks, and the rack # 3 is assigned as a control data record area. Therefore, the optical disc recording apparatus 2 manages the four tracks as the data track #1, the data track #2, the control data record area # 1, and the data track #3.

In the optical disc recording apparatus 2, when the request from the host apparatus 1 is handled as one based on the track number in the same way as the conventional technique, the control data record area # 1 is also handled as a user data track. Thus, the data corresponding to the track #1, the track # 2, the track # 3 and the track # 4 are replied to the host apparatus 1. Therefore, the data of the data track #1, the data track #2, and the control data record area #1 and data track # 3 are transferred to the host apparatus 1. That is to say, the control data record area becomes visible as a track. For instance, when the host apparatus 1 accesses the track # 3, it is necessary that the optical disc recording apparatus 2 notifies the host apparatus 1 that the data track # 3 is different from a usual data track. This is to prevent an unnecessary read-write operation to the control data record area by handling the track #3 as usual data track by the host apparatus 1. The host apparatus 1 also needs to recognize the existence of the control data record area to manage the data area of the optical disc medium 2.

In the optical disc recording apparatus 2, when the request from the host apparatus 1 is handled as one based on the track number concerning the user data, that is, when the control data record area is handled as the system area or one similar to the system area, the data concerning the control data record area is not replied to the host apparatus 1. Therefore, only the data corresponding to the data track # 1 (the track # 1), the data track #2 (the track # 2), and the data track # 3 (Track # 4) are replied to the host apparatus 1. As a result, the control data record area becomes an invisible as a track. For instance, if the host apparatus 1 accesses the track # 3 when the optical disc recording apparatus 2 does not show the control data record area in the data area 138 as a data track, the optical disc recording apparatus 2 replies to the host apparatus 1, the data corresponding to the track numbers reassigned after the control data record areas 134 assigned to the data area 138 is excluded based on the record status control data. Therefore, the data of the track # 4 is recognized as the data of the track # 3 by the host apparatus 1. At this time, the host apparatus 1 needs not to recognize the control data record area in the data area 138 in order to manage the data area of the optical disc medium 2. However, the optical disc recording apparatus 2 needs to reply to the request from the host apparatus 1 excluding the control data record area 134.

In this way, the managing method of the optical disc medium 3 in the host apparatus 1 and the optical disc recording apparatus 2 is different depending on the handling of the control data record area 134 extended to the user area 138. Therefore, a command and a response to the command are extended. The commands relating to the extension of the control data record area are a Reserve Track command and Close Track command.

The Reserve Track command is a command used to reserve a logical address area for the number of the sectors specified by the host apparatus 1 as a track. A command packet of the conventional Reserve Track command is shown in Table 499of the third conventional example. As shown in FIG. 17, a control data record area flag 70 is provided in the bit 0 of the first byte of this command to instruct the track reserved by the command to secure as the control data record area. The number of sector 72 to be secured for the track as the control data record area may be arranged in the fifth to eighth bytes of the command. Also, a new command argument may be provided and arranged. The optical disc recording apparatus 2 receives the Reserve Track command, and when the control data record area flag 70 is true, the optical disc recording apparatus 2 reserves an area for the number of sectors 72 as the control data record area additionally.

The Close Track command is a command used to close, that is, to end the record of the specified track. After the closing process, the optical disc recording apparatus 2 newly sets an invisible track. Therefore, as shown in FIG. 18, a bit 80 of extension of the control data record area is provided in the bit 3 of the second byte of the conventional command packet to indicate whether or not it is permitted to set the control data record area before the invisible track is newly set.

The host apparatus 1 uses a Request Sense command, Read Disc Information command, a Read Track Information command and the like in order to acquire the status of the optical disc recording apparatus 2 and status of the optical disc medium 3.

The Request Sense command is a command issued by the host apparatus 1 to acquire the status of the optical disc recording apparatus 2. Conventionally, this command has been issued if there is the data to be notified to the host apparatus 1 from the optical disc recording apparatus 2 when the status of the optical disc recording apparatus 2 changes, or when the optical disc recording apparatus 2 completes the given command. When the number of the remaining record control areas set in the system area or the data area becomes less than a threshold, the optical disc recording apparatus 2 notifies the status to the host apparatus 1. Receiving the status, the host apparatus 1 transmits the Request Sense command to the optical disc recording apparatus 2. Thus, the issuance of commands is increased. The host apparatus 1 acquires a necessary data from the response to the Request Sense command.

When the host apparatus 1 can recognize the control data record area extended to the data area as a data track, it is necessary to distinguish the track in which the user data is recorded, and the track of the control data record area. For this reason, the Read Disc Information command to acquire the status of the disc, and the Read Track Information command to acquire the state of the track are extended as described below.

Referring to FIG. 15, an extension of the response data to the Read Disc Information command will be described. The conventional response data to the Read Disc Information command is shown in Table 368 of the third conventional example. As shown in FIG. 15, the control data record area flag 70 and the number of times 71 of control data record area extension in the data area are added to the response data.

The value of the bit 5 of the second byte of the command response data is used as the control data record area flag 70 that becomes "1" when the control data record area 134 exists in the data area 138. Also, the 32nd byte of the command response data is used as an area 71 which stores the number of times of the extension of the control data record area, and a data to indicate the number of the control data record areas existing in the data area 138 is added to the command response data. These data may be provided in other unused areas described in Table 368 of the third conventional example, and my be added after an Entries of OPC Table arranged in the 34 to n bytes by changing the command response data length.

Referring to FIG. 16, the extension of the response data to the Read Track Information command will be described. A conventional response data to the Read Track Information command is shown in Table 463 of the third conventional example. As shown in FIG. 16, the control data record area flag 70 is added to the response data. A data of bit 6 of the fifth byte of the command response data is used as the control data record area flag 70 that becomes "1" when the track specified based on the command is the control data record area. After acquiring the response data to the Read Track Information command, the host apparatus 1 recognizes that it is not necessary to carry out the reading/writing process because the track is the control data record area track if the control data record area flag 70 is "1".

It should be noted that the position of the flag of the control data record area may be arranged in an empty portion by changing a part of a data defined in Table 463 of the third conventional example is defined. Otherwise, the position may be arranged in a portion of data bytes newly added.

The extension method of the control data record area arranged in the data area will be described in the optical disc recording system by using the control data record area extended thus and the commands.

In the optical disc medium 3, the system area is arranged in an area equal to or less than 30000h physical address, and the data area is arranged in an area equal to or more than 30000h physical address. The control data record area 130 and the lead-in area 131 are arranged in the system area. The tracks 132, 133, 134, and 135 are arranged in the data area 138 to record the user data. The track 134 of these tracks is set as the control data record area. It is when the host apparatus 1 issues the Close Track command of the invisible track or when it issues the command to secure the control data record area that the extension of the control data record area is carried out by arranging the control data record area 134 in this data area 138. That is, it is necessary to issue a command to secure the control data record area after the Close Track command of the invisible track is issued before a Write (10) command to record the data in the invisible track or the Reserve Track command to record to reserve a logical track is issued. This is because that the invisible track is a track in the outermost side of the disc, and the end address is determined depending on an amount of data recorded until the track is closed.

Figure 20:
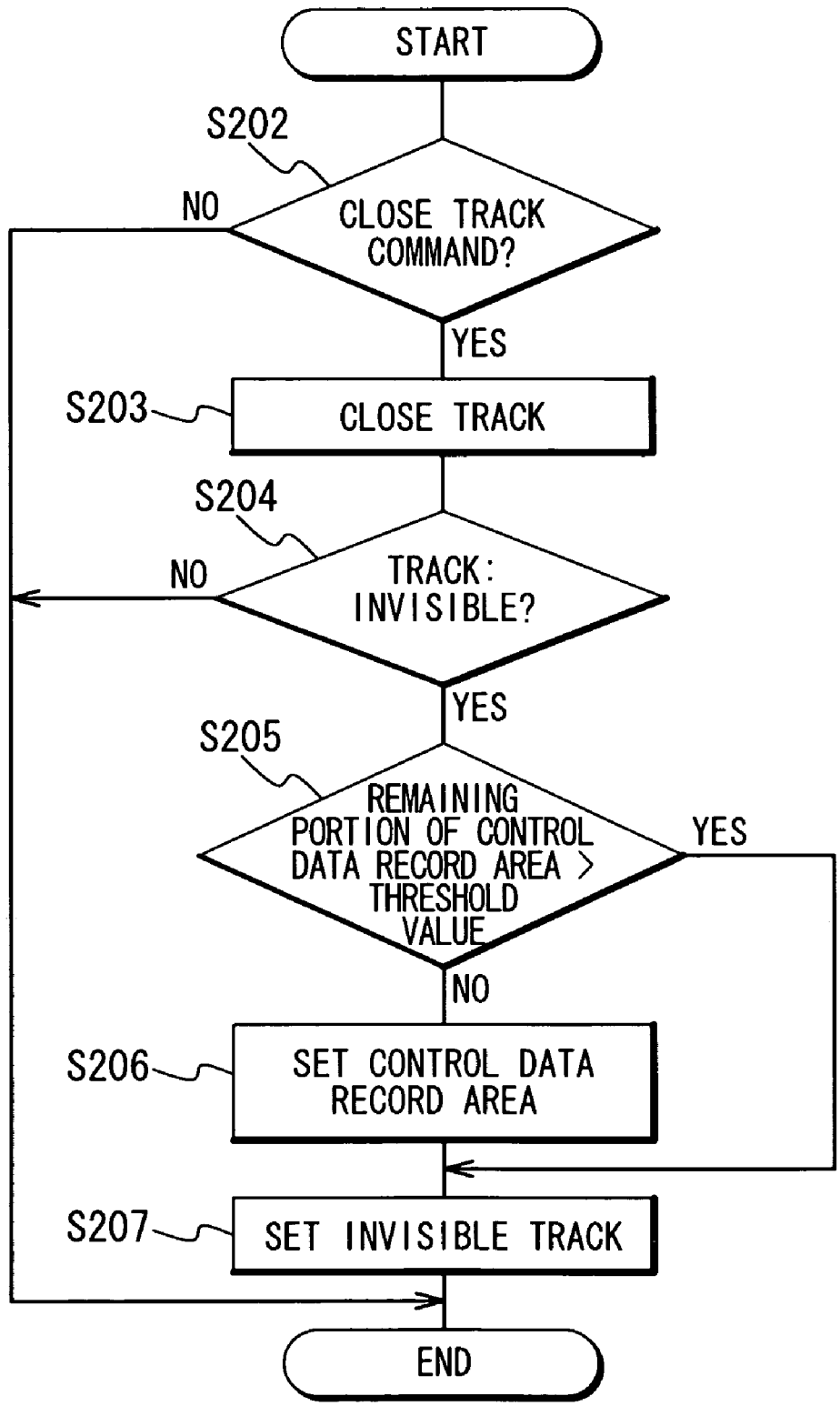
FIG. 20 is a flow chart showing an operation of the CPU in a first extension method of the control data record area to the data area.

Referring to FIGS. 5 and 20, a first method for the optical disc recording apparatus 2 to extend the control data record area autonomously will be described. In a first operation, when the host apparatus 1 issues the Close Track command of the invisible track, the optical disc recording apparatus 2 extends the control data record area 134 in the data area 138 irrespective of the command form the host apparatus 1 if the amount of the remaining area of the control data record area to record the current record status control data is equal to or less than a threshold.

When the host apparatus 1 issues the Close Track command for the invisible track 133 of a track number # (n−1), the optical disc recording apparatus 2 closes the track # (n−1) in response to the command. Then, the optical disc recording apparatus 2 records an updated record status control data in the first control data record area 130. In case that the amount of the remaining area of the first control data record area 130 is equal to or less than the threshold, the optical disc recording apparatus 2 reserves the control data record area 134 for the predetermined number of sectors in the track #n. If the control data record area 134 is newly reserved in the data area 138, the optical disc recording apparatus 2 records a flag in the system area to indicate that the control data record area is extended to the data area. Also, the optical disc recording apparatus 2 updates the number of the control data record areas that exist in the data area 138, and the record status control data, and then records the updated record status control data in the first control data record area 130 in the optical disc medium 3.

Next, the optical disc recording apparatus 2 generates a new invisible track 135 in the track # (n+1), and updates the record status control data and then records the updated record status control data in the first control data record area 130 in the optical disc medium 3. The optical disc recording apparatus 2 notifies the host apparatus 1 the fact that the closing process of the track with the track number # (n−1) normally ends, and a status indicating the fact that the control data record area 134 has been newly extended, in response to the Close Track command. Thus, the host apparatus 1 can not only detect that the response data to the Close Track command indicates a normal end, but also detects the existence of the data other than the track managed by user in the optical disc medium 3 from the reception of the status of the extended control data record area. Also, because the control data record area is extended in the optical disc recording apparatus 2 without depending on the command from the host, the number of the remained sectors of the data area 138 in the optical disc medium 3 is not coincident with the value held by the host apparatus 1. For this reason, the host apparatus 1 issues the command to acquire the number of empty sectors in the optical disc media 3, and confirms the number of empty sectors in the optical disc media 3. In addition, when the host apparatus 1 adds the data to the optical disc medium 3, the host apparatus 1 uses the command to obtain the status of the disc or track in order to acquire the number of tracks of the data in the optical disc medium 3 or state of the track. The host apparatus 1 determines a next recordable logical address based on the acquired data.

In above description, a case that the amount of the remaining area of the first control data record area 130 is equal to or less than the threshold is described. However, it should be noted that the same operation can be accomplished even when the amount of the remaining area in the first control data record area 134 extended to the data area 138 is equal to or less than the threshold, if the control data record area can be further extended to the data area 138.

An operation of the CPU 11 in the first method to extend the control data record area to the data area will be described with reference to FIG. 20. When the host apparatus 1 issues a command to the optical disc apparatus 2, the CPU 11 analyzes the command to determine whether or not the received command is the Close Track command (step S202). If the received command is not the Close Track command (step S202—NO), the control is ended. If the received command is the Close Track command (step S202—YES), the Close Track process is carried out (step S203). In the Close Track process, an unused sector in the reserved area is buried with a dummy data. Then, the updated record status control data is recorded in the control data record area 130 or the control data record area 134 in the optical disc medium 3.

Next, it is determined whether or not the closed track is an invisible track (step S 204). If the closed track is not an invisible track (step S204—NO), the command response data is set and the control operation is ended since it is not the end process of the invisible track.

On the other hand, if the closed track is an invisible track (step S204—YES), the amount of the remaining area and the threshold of the control data record area are compared (step S205). As the result of the comparison, the control data record area 134 is set in the data area 138 as a control data record area (step S206) when the amount of the remaining area is equal and less than the threshold (the step S205—NO). In the process of setting the control data record area, the control data record area 134 for the predetermined number of sectors is set for the ended invisible track 133, and the start address and end address of the control data record area 134 newly set are set and updated. Here, a method is known in which the control data record area 134 newly set is used until the control data record areas other than the control data record area 134 newly set are filled with predetermined data, or these areas are entirely used, as will be described later in detail.

Next, a new invisible track is set (step S207), and the command response data is set and the process of the command is ended. When the amount of the remaining area of the control data record area is larger than the threshold (step S205—YES), the invisible track setting process is carried out processed (step S207). Then, the command response data is set and the process of the command is ended.

In the invisible track setting process (step S207), the invisible track for data to be next written is newly set, and the record status control data of the invisible track newly set is updated and the command process is ended.

In the first operation, the amount of the remaining area and the threshold of the control data record area are compared with each other (step S205) and the control data record area setting process (step S206) is carried out. Therefore, the setting of the control data record area in the data area 138 is made possible, which cannot be carried out by the conventional optical disc recording apparatus.

In this embodiment, the program to be carried out by the CPU 11 is described as an example. The same operation can be achieved using by a logical circuit.

Next, two kinds of recording method will be described, when a new control data record area is provided on the data area in case that the above-mentioned optical disc recording apparatus 2 can manage a plurality of control data record areas at the same time.

In a first recording method, an unused area of the existing control data record area is filled with predetermined data before a new control data record area 134 is provided. Thus, since the optical disc recording apparatus 2 is sufficient to manage one control data record area any time, the optical disc recording apparatus 2 can quickly search the latest record status control data as soon as the optical disc medium 3 is inserted in the optical disc recording apparatus 2. Here, the predetermined data is configured of the latest record status control data or dummy data.

In a second recording method, even though the control data record area 134 is newly set, the new control data record area 134 is not used until the unused area of the existing control data record area is completely used out. The record status control data is recorded in the unused area of the existing control data record area. In the second recording method, because the latest recording status management data is searched from a plurality of control data record areas when the optical disc medium 3 is inserted in the optical disc recording apparatus 2. Therefore, the second method is inferior in the search speed to the first method, but the control data record area can be efficiently used.

Here, the threshold of the amount of reminded area of the control data record area will be described. The threshold of the amount of reminded area of the control data record area should have a value twice or more larger than the number of tracks for data that can be opened at the same time. There is a case that the commands such as the Reserve Track command and the Close Track command are issued to the optical disc recording apparatus 2 even if the data recording operation is not carried out. Therefore, the control data record area is necessary to update two record status control data. For instance, in the above-mentioned operation shown in FIG. 2, the Reserve Track command, the Synchronize Cache command, and the Close Track command are issued to the first track and the second track. Therefore, three record status control data are necessary for one track, and four record status control data from the step 5 to the step 9 are necessary for an invisible track, and as the result of this, 10 (=3*2+4) record status control data are necessary. Considering that the Synchronize Cache command are actually issued to one track a plurality of times, it is preferable to set the value of about five times of the tracks that opened at the same time. Therefore, it is preferable that the threshold of the remained number of the control data record areas is, for example 15 in the embodiment.

In addition, when the optical disc apparatus 2 frequently updates the record status control data, it is effective to increase the threshold more than usual for the extension of the control data record area to the data area earlier or to extend the control data record area to the data area even if the remaining area is larger than the threshold.

Moreover, the predetermined number of sectors in the extension of the control data record area may be approximately same as the number of sectors secured in the first control data record area 130. It is possible to secure adaptive control data record areas from the number of sectors used in the data areas 138, the number of the record status control data, and the number of empty sectors in the data areas. For instance, the predetermined number of sectors can be determined from the following equation:

(the predetermined number of sectors)=(the number of empty sectors in data area)/(the number of used sectors)*(the number of record status control data).

The adaptive control data record area 134 is calculated and secured from an average record data size of the recorded data and a free area of the data area 138. Thus, the effective record data management of the optical disc medium 3 can be carried out. Also, the optical disc recording apparatus 2 is generally recorded in every ECC block. Therefore, the number of sectors becomes a multiple of the number of sectors for the ECC block. For instance, the value of 400 ECC blocks (6400 sectors) is set as the predetermined number of sections.

In addition, the optical disc recording apparatus 2 includes the temporary record status control data memory 125 in the RAM 12 to store a plurality of the record status control data. For a case that the Synchronize Cache command is issued a plurality of times before the control data record area 134 is extended to the data area 138, the record status control data to be updated is stored in the temporary record status control data memory 125. Thus, the optical disc recording apparatus 2 can normally operate even if the control data record area is in short until the invisible track is closed.

Figure 21:
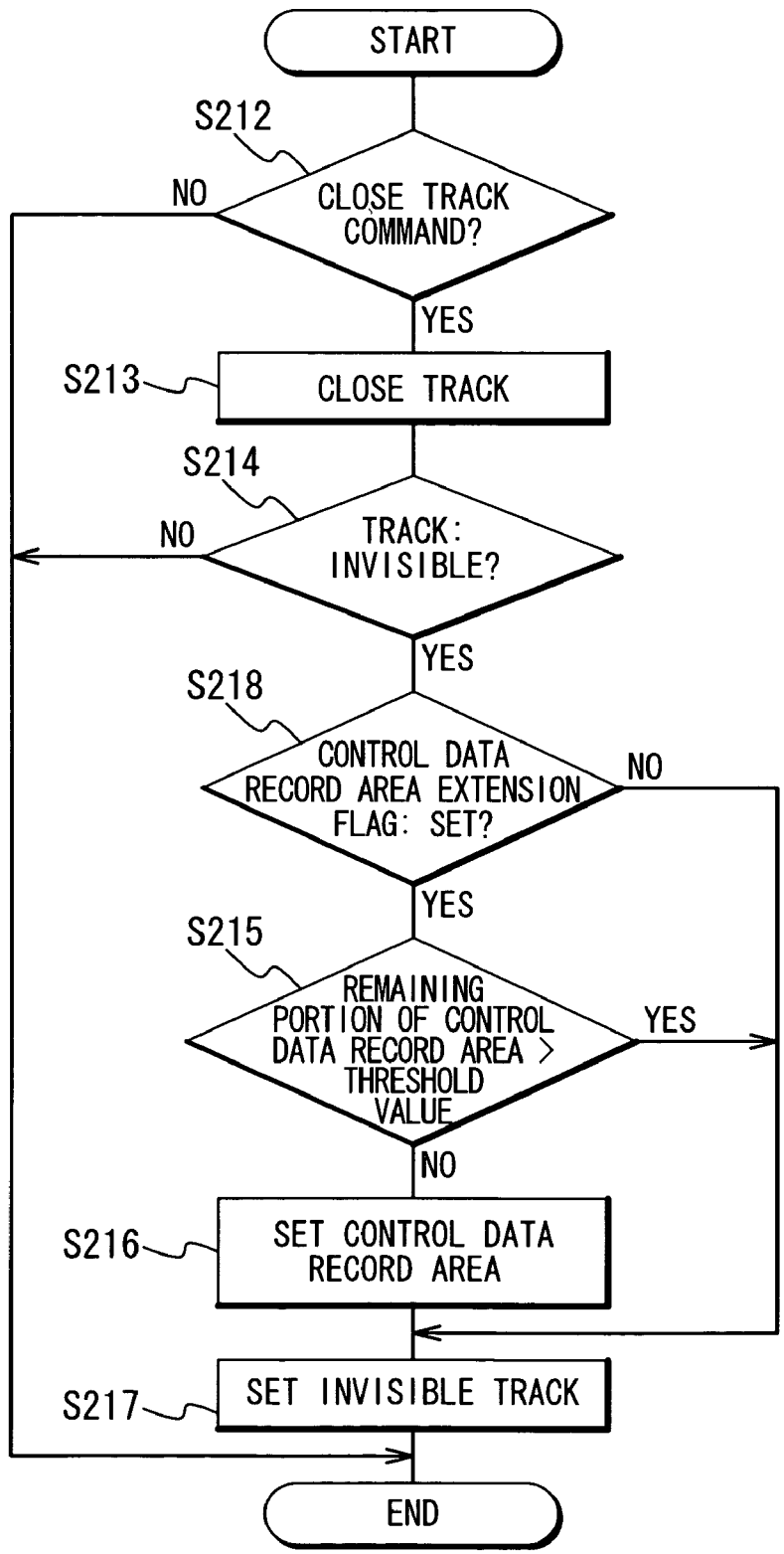
FIG. 21 is a diagram showing an operation of the CPU in a second extension method of the control data record area to be extended into the data area.

A second extension method of the control data record area by the optical disc recording apparatus 2 will be described with reference to FIGS. 5 and 21. In the second extension method, the optical disc recording apparatus 2 extends the control data record area only when the host apparatus 1 permits.

When the host apparatus 1 issues the Close Track command for the invisible track to which an control data record area extension permission flag is added, the optical disc recording apparatus 2 newly extends the control data record area to the data area when the extension permission flag indicates "true" and the remaining area of the current control data record area, which stores the current record status control data, becomes equal to or less than the threshold.

When the host apparatus 1 determines to be permitted to extend the control data record area 134 to the data area 138, an extension permission flag 80 of the control data record area in the command is set to a true state in the issuance of the Close Track command for the invisible track.

In FIG. 5, when the Close Track commands is issued for the (n-1) track as the invisible track, the extension permission flag 80 is set to the true state. The optical disc recording apparatus 2 secures a new control data record area 134 in the track #n, after the invisible track is closed, when the argument of the Close Track command indicates the invisible track as the object track, the extension permission flag 80 is true, and the amount of the remaining area of the control data record area in the optical disc medium is equal to or less than the threshold. In this way, a newer invisible track # (n+1) is continuously provided.

Here, whether or not the extension permission flag 80 for the control data record area should be set to the true state in the issuance of the Close Track command for the invisible track from the host apparatus 1 is dependent on whether or not in the processing sequence of the host apparatus 1 for the permission. Therefore, the state of the optical disc recording apparatus 2 gives no affect on the determination. In other words, even if the control data record area of optical disc recording apparatus 2 is less than the threshold, the extension of the control data record area is not carried out when the permission flag 80 of the control data record area is "false" or reset. The permission flag 80 of the control data record area is reset to indicate a prohibition when the address data managed by the host apparatus 1 should not be changed during the recording operation to the optical disc medium 3. For instance, when the host apparatus 1 records a file management data existing in the optical disc medium 3, there is a case that an offset address is changed due to the existence of the control data record area between the data tracks if the position to record is not indicated by using a logical address but by an offset address from a certain reference address.

Moreover, when the control data record area of the optical disc medium 3 is equal to or less than the threshold, the optical disc recording apparatus 2 notifies to the host apparatus 1, a status indicating the fact that the amount of the remained control data record area is equal to or less than the threshold as the response data to the Write (10) command and the Synchronize Cache command to the invisible track issued from the host apparatus 1. In this way, the host apparatus 1 can appropriately set the extension permission flag of the control data record area of the invisible track.

The optical disc recording apparatus 2 notifies the host apparatus 1 of the status indicating the fact that the track close is ended normally, and the control data record area is newly extended as a response to the track close command. The host apparatus 1 receives not only the status indicating the response data of the normal end of the track close but also the status indicating the extension of the control data record area. Therefore, the host apparatus 1 can detect that the data other than the data in the track managed by the user exists in the optical disc medium 3. As a result, a proper processing can be accomplished in case of the data management of the host apparatus 1 by using the track number.

In addition, when the host apparatus 1 adds data to the optical disc medium 3, the host apparatus 1 uses the command to acquire the disc status and the command to acquire track status to acquire the number of tracks and track status in the optical disc medium 3. The host apparatus 1 determines the logical address for the data to be recorded based on the acquired statuses.

Next, an operation of the CPU 11 in the second extension method for the control data record area to be extended into the data area will be described with reference to FIG. 21. When the host apparatus 1 issues the command to the optical disc apparatus 2, the CPU 11 analyzes the command. Whether the received command is a Close Track command is determined (step S212). If the received command is not the Close Track command (step S212—NO), the control operation is ended. If the received command is the Close Track command (step S212—YES), the Close Track process is carried out (step S213). In the Close Track process, the process of filling an unused sector of the reserved area with the dummy data is carried out. The updated record status control data is recorded in the control data record area 130 or the control data record area 134 in the optical disc medium 3.

Next, it is determined whether the closed track has been an invisible track (step S 214). If the closed track is not the invisible track (step S214—NO), the command response data is set since the process to the invisible track is not ended, and the processing is finished.

If the closed track is the invisible track (step S214—YES), the extension permission flag 80 of the control data record area is checked, which is set to the Close Track command (step S218). If the extension permission flag 80 of the control data record area indicates the permission status (step S218—YES), the amount of the remaining area of the control data record area and the threshold are compared (step S215). As the result of the comparison, the control data record area 134 is set in the data area 138 as a control data record area (step S216) when the amount of the remaining area is equal and less than the threshold (the step S215—NO). In the process of the control data record area, the control data record area 134 of the predetermined number of sectors are set following the ended invisible track 133, and the start address and end address of the newly set control data record area 134 are set and updated in the record status control data. Here, the control data record areas other than the control data record area 134 newly set are filled with predetermined data, or the control data record area newly set is not used until the existing control data record area has completely used out, as described later.

Next, a new invisible track is set (step S217), and the command response data is set and the process of the command is ended.

When the extension permission flag 80 of the control data record area indicates non-permission (step S218—NO) or when the amount of the remaining area of the control data record area is larger than threshold (step S215—YES), the invisible track setting process is carried out (step S217), and the command response data is set to end the process.

In the invisible track setting process (step S217), the invisible track for data to be next recorded is newly set, the record status control data of the invisible track newly set is updated and process is ended.

The difference from the operation of the CPU 11 in the above mentioned first operation is in that determination of a control data record area extension flag (step S218) is added between the determination of the invisible track (step S214) and the comparison of the remained number of the control data record areas and the threshold (step S215). By providing the determination of the control data record area extension flag (step S208), the optical disc recording apparatus 2 can recognize when the host apparatus 1 should extend the control data record area. Therefore, this method is especially effective when the host apparatus 1 controls the optical disc recording apparatus 2 in detail.

In this embodiment, the program to be carried out by the CPU 11 is described as an example. However, the same operation can be accomplished by using a logical circuit.

A third extension method of the control data record area by the optical disc recording apparatus 2 will be described with reference to FIGS. 5 and 21. In the third extension method, the optical disc recording apparatus 2 extends the control data record area under a control of the host apparatus 1.

The host apparatus 1 issues a command to reserve the control data record area on the data area following the Close Track command of the invisible track. Then, the optical disc recording apparatus 2 newly extends the control data record area to the data area based on the request of the size of the area from the host apparatus 1.

Moreover, the optical disc recording apparatus 2 notifies the host apparatus 1 the fact that the amount of the current remaining area of the control data record area become equal to or less than the threshold by using the status. Therefore, the host apparatus 1 can issue a command to reserve the control data record area on the data area.

When the host apparatus 1 issues the Write (10) command and the Synchronize Cache command to the track # (n−1) as an invisible track, the optical disc recording apparatus 2 notifies the host apparatus 1 of the status indicating that the amount of the remaining area of the control data record area is equal to or less than the threshold, as the command response data if the remaining area of the control data record area of the optical disc medium 3 is equal to or less than the threshold. The host apparatus 1 checks the status of the command response data, and ends the recording process, and issues the Close Track command of the track # (n−1).

Next, when the status notified from the optical disc recording apparatus 2 indicates that the remaining area of the control data record area is equal to or less than the threshold, the host apparatus 1 sets the number of sectors to be secured for a control data record area in the argument, and issues the command to reserve the control data record area in the data area 138. The optical disc recording apparatus 2 sets the control data record area in the track #n for the requested number of sectors. Then, the optical disc recording apparatus 2 newly sets the invisible track # (n−1). The optical disc recording apparatus 2 sets the normal end in the command response data, and replies to the host apparatus 1. The host apparatus 1 can recognize that the track number of the invisible track or the logical address for data to be next recordable to the invisible track are changed when the command for reserving or setting the control data record area 134 in the data area 138 is ended normally. Therefore, the host apparatus 1 uses the Read Disc Information command and the Read Track Information command, and acquires the number of tracks of data and the track status in the optical disc medium 3, and then determines the logical address for data to be recorded in the invisible track.

When the control data record area flag 70 is set of the track reservation command in spite that the remaining area of the control data record area is larger than the threshold, the optical disc recording apparatus 2 may set an error as the command response data without securing the control data record area, or may secure the control data record area for the requested number of sectors from the host apparatus 1 and may set the invisible track #(n+1).

As mentioned above, as the command to reserve the control data record area in the data area, the Reserve Track command is used. The optical disc recording apparatus 2 receives the Reserve Track command and reserves the track for the number of sectors 72 to be newly secured as the control data record area.

Here, the number of sectors 72 to be secured as the control data record area is set in a multiple of ECC block since the recording operation is carried out in every ECC block, and the control data record area uses one ECC for one update. Therefore, it is preferable to secure an area for the number of ECC blocks which is larger than the threshold. It should be noted that when the unit of the record is a sector unit, the ECC block can be replaced in the sector.

Figure 22:
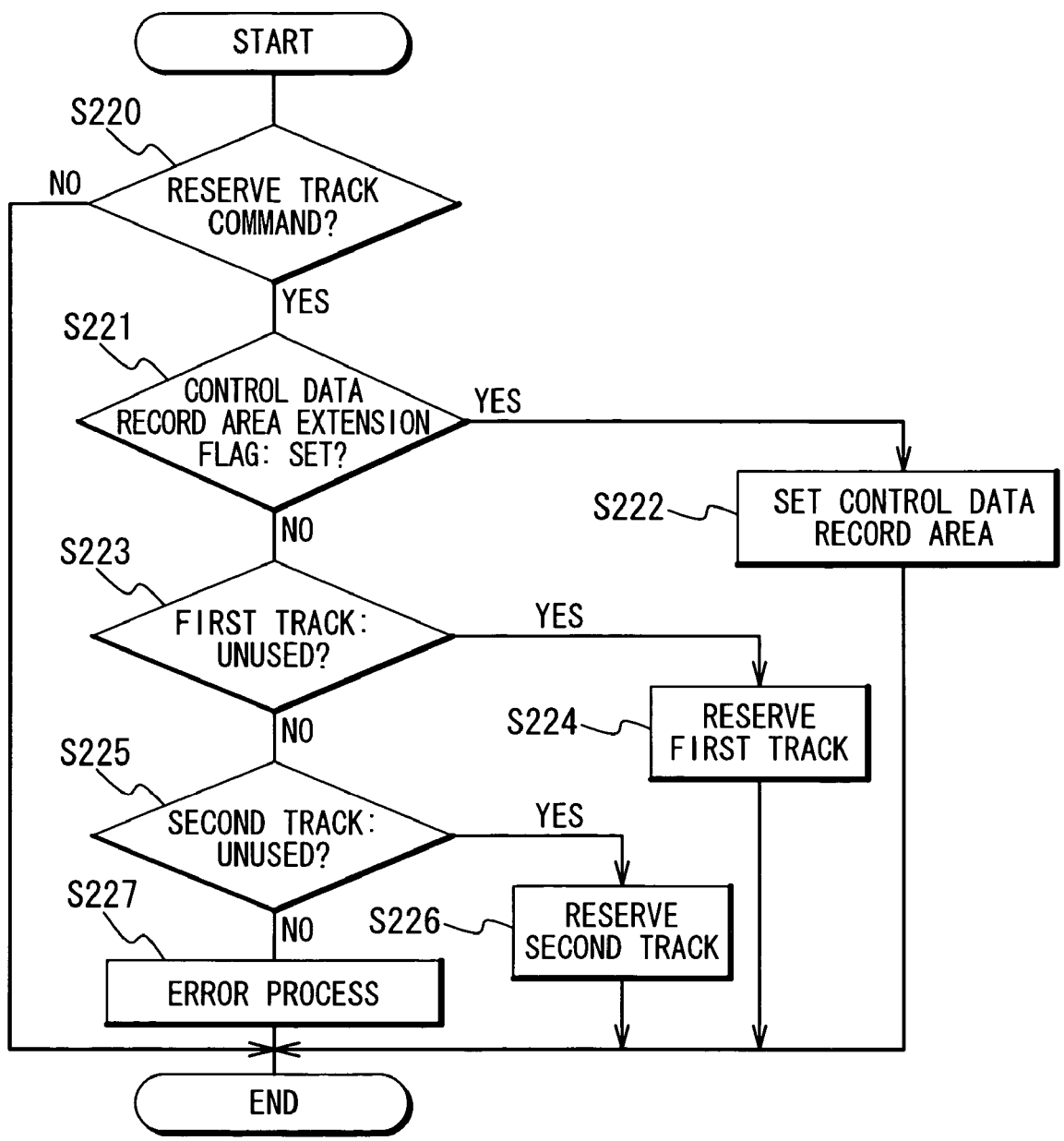
FIG. 22 is a diagram showing an operation of the CPU in a third extension method of the control data record area to the data area.

An operation of the CPU 11 in the third method to extend the control data record area to the data area will be described with reference to FIG. 22. When the host apparatus 1 issues a command to the optical disc apparatus 2, the CPU 11 analyzes the command to determine whether the received command is the Reserve Track command or not (step S220). If the received command is not the Reserve Track command (step S220—NO), the control operation is ended. If the received command is the Reserve Track command (step S220—YES), the control data record area flag 70 of the Reserve Track command is determined (the step S221). If the control data record area flag 70 indicates the control data record area setting (step S22 1—YES), the control data record area setting process to set a new control data record area 134 in the data area 138 is carried out (step S222), and the control operation is ended. If the control data record area flag 70 does not indicate the control data record area setting (the step S 221—NO), it is determined whether the first track is unused (step S223). If the first track is unused (step S223—YES), the reserving process of the first track is carried out. Since the first track is unused, in the first track reserving process, the number of sectors specified based on the Reserve Track command argument is reserved as the first track. Then, the record status control data is updated (step S224). Thereafter, the control operation is ended.

If the first track is used (step S223—NO), it is determined whether the second track is unused (step S225). If the second track is unused (step S 225—YES), the reserving process of the second track is carried out. Since the second track is unused, in the second track reserving process, the number of sectors specified based on the Reserve Track command argument is reserved as the second track, and the record status control data is updated (step S226). Thereafter, the control operation is ended. If the second track is also used (step S225—NO), an error process is carried out. In the error process, the generated error status is set in the command response data (step S227), and the control operation is ended.

In the third extension method of the control data record area to the third data area, by providing the determining process of the control data record area flag 70 of Reserve Track command (step S221) and the control data record area setting process in which the new control data record area 134 is set in data area 138 (step S222), the extension of the control data record area to the data area can be made possible, which can be never carried out in the conventional optical disc recording apparatus.

In this embodiment, the program to be carried out by the CPU 11 is described as an example. The same operation can be achieved using by a logical circuit.

As mentioned above, when the control data record area is in short in the closing process of the invisible track, the control data record area 134 is newly set in the data area 138 following the invisible track. When a plurality of logical volumes that are referred to as sessions are set in the optical disc medium 3, borders of the sessions are assigned as the system area. Therefore, the control data record area that has the same function as the first control data record area 130 can be arranged in the session border.

When a plurality of sessions are provided in the write-once optical disc 3, the data area is set in the session that addition record is possible. The control data record area of the present invention can be applied in such the data area.

Also, when the host apparatus 1 tries to directly access the control data record area managed by the optical disc recording apparatus 2, the optical disc recording apparatus 2 returns or replies an error. That is, when the host apparatus 1 issues the Write (10) command or the Read (10) command to the logical address in the track assigned to the control data record area, the optical disc recording apparatus 2 returns the error without the writing and reading operations. In this way, it is possible to prevent the user from accessing the control data record area arranged in the data area erroneously when the record status control data is arranged in the data area although the record status control data is only in the system area conventionally. Especially, when a data indicating that the logical address specifies the control data record area is notified to the host apparatus in the returning of the error, the host apparatus 1 can efficiently control the optical disc recording apparatus 2 because it is no need to carry out a retry operation and the like.

Figure 23:
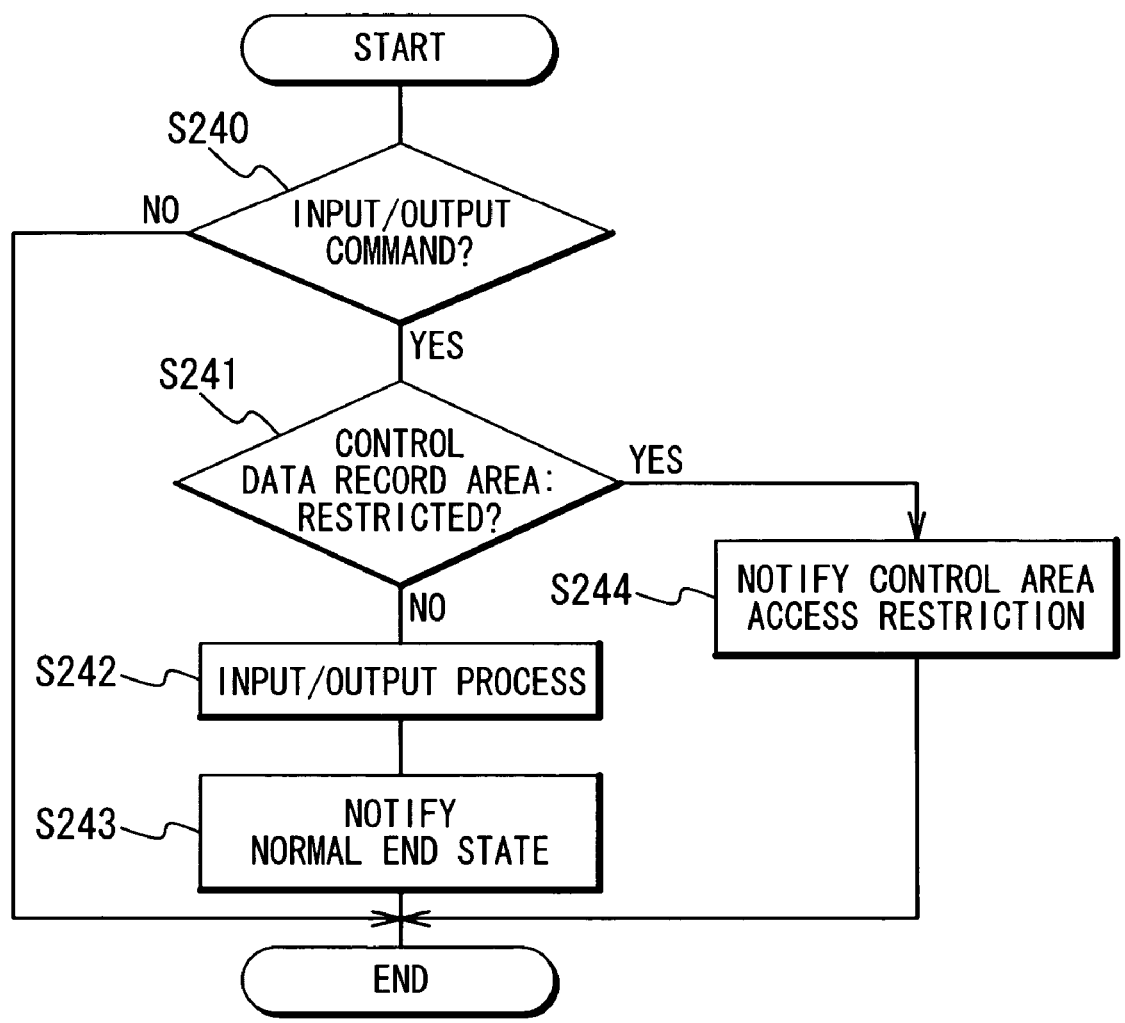
FIG. 23 is a flowchart when the optical disc recording apparatus receives a command of an input and output to the logical address of the control data record area.

FIG. 23 shows a flowchart when the optical disc recording apparatus 2 receives a command of an input and output to the logical address of the control data record area. The difference from the conventional input and output operation is in that in the present invention, the determining process of the control data record area (step S241) and a notifying process of control data access limitation (step S244) are provided. In the control data record area determining process, it is determined whether the logical address for the input and output is the control data record area or not.

Receiving a command from the host apparatus 1, the optical disc recording apparatus 2 analyzes the command. It is determined whether the received command is the I/O command such as the Read command and the Write command (step S240). If the received command is not the I/O command (step S240—NO), the control operation is ended. If the received command is the I/O command (step S240—YES), it is determined whether the logical address for the input and output is an address in the control data record area (step S241). If the logical address is not the address for the input and output in the control data record area (the step S241—NO), the optical disc recording apparatus 2 carries out a usual I/O operation because it is not the input and output to the control data record area. In the I/O operation, the user data is read out from the optical disc medium 3 and the user data is recorded in the optical disc medium 3 (step S242). Thereafter, in an I/O status notifying process, the status in the end of the input and output is set to the command response data to notify the host apparatus 1 (step S243), and then the control operation is ended.

If the logical address for the input and output is in the control data record area (step S241—YES), the management area access limitation notifying process is carried out since it is an input and output to the control data record area. In the management area access restricting process, the data indicating that the access address indicates the control data record area is set in the command response data to notify the host apparatus 1 (step S244), and the control operation is ended.

Hereinafter, the method will be described in which the host apparatus 1 acquires the control data when the control data record area 134 exists in the data area 138 of the optical disc medium 3 by using the above-mentioned Read Disc Information command and the Read Track Information command.

As shown in FIG. 15, the number of tracks in the entire disc area including the control data record area, a flag data whether or not the control data record area exists in the data area, and the number of the control data record areas in the data area are set in the command response data to the Read Disc Information command. Using these data, the host apparatus 1 can determine the total number of the tracks in the optical disc medium 3, the existence of the tracks that cannot be operated, and the numbers of the tracks that cannot be operated. In order to determine which track is of the control data record area, the Read Track Information command is issued for the total number of tracks in the optical disc medium 3 from the track number #1 sequentially. As shown in FIG. 16, the control data record area flag 70 is set to the response data to the Read Track Information command to indicate whether or not the track is the control data record area.

If the n-th track is the control data record area, a flag data is set to the response data to the Read Track Information command issued to the n-th track to indicate that the track is the control data record area. The host apparatus 1 can recognize that the track is the control data record area, based on the flag data. Therefore, the host apparatus 1 can efficiently carry out the control of the optical disc recording apparatus 2 because the host apparatus 1 does not carry out the reading/recording operation to the n-th track.

When the control data record area extended to the data area is concealed by the optical disc recording apparatus 2, so that the host apparatus 1 cannot treat the control data record area extended to the data area as a data track, the host apparatus 1 can carry out the recording/reading control in the same way as to the conventional optical disc recording apparatus. Especially, when receiving the Close Track command of the invisible track, the optical disc recording apparatus 2 determines that the remaining area of the control data record area to store the current record status control data becomes equal to or less than the threshold. In this case, if the control data record area is extended to the data area without depending on the command from the host apparatus 1, there is an excellent effect that it is not required to modify the control program of the host apparatus 1 largely to control the optical disc recording apparatus 2, compared with the conventional program.

As described above, in the present invention, the control data record area is extended to the data area once or many times for the record management of the optical disc medium. Therefore, it is possible to record data in the optical disc medium that a user data cannot be added in spite of an unused area in the data area due to the constraint of the control data record area. As a result, the user can effectively use the optical disc medium.

What is claimed is:

1. An optical disc recording system comprising:
a host apparatus configured to issue commands; and
an optical disc recording apparatus configured to carry out a process corresponding to each of said commands, and to reply a response data to said command to said host apparatus,
wherein said host apparatus issues a record command as one of said commands to record a record data in an optical disc medium,
an optical disc recording apparatus records said record data in a data area in a predetermined format in response to said record command, wherein said optical disc comprises said data area and a first control data recording area,
said optical disc recording apparatus additionally sets each of second control data recording areas in said data area in association with a command from said host apparatus as one of said commands,
a record status control data is recorded in said first or second control data recording area to indicate record status of said record data,
at least a part of information related to said additional setting of a second control data recording area is shared by said host apparatus and said optical disc recording apparatus,
wherein when a size of an unused record area remaining in said first control data recording area or said second control data recording areas is equal to or less than a predetermined threshold, it is determined that said second control data recording area should be additionally set in said data area,
wherein said predetermined threshold is equal to or larger than 2*m, where m is a number of said tracks accessible at a same time, to one of record units of said record data.

2. The optical disc recording system according to claim 1, wherein said information related to said additional setting comprises at least one of a number of said second control data recording areas and addresses of said second control data recording areas.

3. The optical disc recording system according to claim 1, wherein a check is made to determine whether or not a second control data recording area is additionally set in said data area each time said record status control data is recorded when a predetermined record time elapses or when the record of said record data is once ended.

4. The optical disc recording system according to claim 1, wherein said optical disc recording apparatus notifies said host apparatus of a fact that it is determined that said second control data recording area should be additionally set in said data area.

5. The optical disc recording system according to claim 1, wherein said optical disc recording apparatus sets a data indicating that said second control data recording area is additionally added, in said response data to said command.

6. The optical disc recording system according to claim 5, wherein said command is one of a Reserve Track command, a Write (10) command, a Write (12) command, a Synchronize Cache command and a Close Track command which are defined in ANSI MMC-4.

7. The optical disc recording system according to claim 1, wherein said host apparatus determines whether an area for said record status control data is insufficient to record subsequent data, and issues a secure command to said optical disc recording apparatus to secure said second control data recording area in said data area, subsequently to a close commend to close an invisible track, and said optical disc recording apparatus additionally secures said second control data recording area in said data area in response to said secure command.

8. The optical disc recording system according to claim 1, wherein said host apparatus transmits an input/output command to input or output said record status control data in said second control data recording area to said optical disc recording apparatus, and
said optical disc recording apparatus sets a data in said response data to said input/output command to indicate that it is not possible to carry out the input/output of said record status control data in said second control data recording area.

9. An optical disc recording system comprising:
a host apparatus configured to issue commands; and
an optical disc recording apparatus configured to carry out a process corresponding to each of said commands, and to reply a response data to said command to said host apparatus,
wherein said host apparatus issues a record command as one of said commands to record a record data in an optical disc medium,
an optical disc recording apparatus records said record data in a data area in a predetermined format in response to said record command, wherein said optical disc comprises said data area and a first control data recording area,
said optical disc recording apparatus additionally sets each of second control data recording areas in said data area in association with a command from said host apparatus as one of said commands,
a record status control data is recorded in said first or second control data recording area to indicate record status of said record data,
at least a part of information related to said additional setting of a second control data recording area is shared by said host apparatus and said optical disc recording apparatus,
wherein after an invisible track is closed and a termination position thereof is determined, said second control data recording area is additionally set subsequently to the closed invisible track, and
wherein said optical disc recording apparatus receives a close command from said host apparatus to close said invisible track, and additionally sets a second control data recording area when determining that an area for said record status control data is insufficient to record subsequent data, and sets a data indicating addition of said second control data recording area, in said response data to said close command.

10. The optical disc recording system according to claim 9, wherein said close command has an extension permission flag to indicate that said host apparatus permits said optical disc recording apparatus to additionally set said second control data recording area in said data area, and
said optical disc recording apparatus additionally sets said second control data recording area only when said extension permission flag indicate a permission, and notifies addition of said second control data recording area to the host apparatus.

11. The optical disc recording system according to claim 9, wherein a secure command to secure a track in said data area has a control data recording area flag to specify whether or not said track should be secured for said second control data recording area,
when determining that an area for said record status control data is insufficient to record subsequent data, said host apparatus issues said secure command to said optical disc recording apparatus subsequent to a close command to close an invisible track, and
said optical disc recording apparatus additionally secures said second control data recording area in said data area in response to said secure command.

12. An optical disc recording system comprising:
a host apparatus configured to issue commands; and
an optical disc recording apparatus configured to carry out a process corresponding to each of said commands, and to reply a response data to said command to said host apparatus,
wherein said host apparatus issues a record command as one of said commands to record a record data in an optical disc medium,
an optical disc recording apparatus records said record data in a data area in a predetermined format in response to said record command, wherein said optical disc comprises said data area and a first control data recording area,
said optical disc recording apparatus additionally sets each of second control data recording areas in said data area in association with a command from said host apparatus as one of said commands,
a record status control data is recorded in said first or second control data recording area to indicate record status of said record data,
wherein said host apparatus issues a status acquire command to acquire a status of said optical disc to said optical disc recording apparatus,
said optical disc recording apparatus sets said second control data recording area associated data in said response data to said status acquire command, and
wherein said second control data recording area associated data contains at least one of a flag to indicate that said second control data recording area exists and a number of the areas which said record status control data is stored in said optical disc medium.

13. The optical disc recording system according to claim 12, wherein the number of the areas which said record status control data are recorded in said optical disc medium is a number of said second control data recording areas.

14. The optical disc recording system according to claim 12, wherein the number of the areas which said record status control data are recorded in said optical disc medium is a number of said first control data recording areas and said second control data recording areas.

15. An optical disc recording system comprising:
a host apparatus configured to issue commands; and
an optical disc recording apparatus configured to carry out a process corresponding to each of said commands, and to reply a response data to said command to said host apparatus,
wherein said host apparatus issues a record command as one of said commands to record a record data in an optical disc medium,
an optical disc recording apparatus records said record data in a data area in a predetermined format in response to said record command, wherein said optical disc comprises said data area and a first control data recording area,
said optical disc recording apparatus additionally sets each of second control data recording areas in said data area in association with a command from said host apparatus as one of said commands, a record status control data is recorded in said first or second control data recording area to indicate record status of said record data, wherein management of a track as said second control data recording area is different from management of a track for said record data.

16. The optical disc recording system according to claim 15, wherein a field of said record status control data for managing said track as said second control data recording area is different from that of said record status control data for managing said track for said record data.

17. An optical disc recording system comprising:

a host apparatus configured to issue commands; and an optical disc recording apparatus configured to carry out a process corresponding to each of said commands, and to reply a response data to said command to said host apparatus, wherein said host apparatus issues a record command as one of said commands to record a record data in an optical disc medium, an optical disc recording apparatus records said record data in a data area in a predetermined format in response to said record command, wherein said optical disc comprises said data area and a first control data recording area, said optical disc recording apparatus additionally sets each of second control data recording areas in said data area in association with a command from said host apparatus as one of said commands, a record status control data is recorded in said first or second control data recording area to indicate record status of said record data, wherein management of a track as said second control data recording area is same as management of a track for said record data.

18. The optical disc recording system according to claim 17, wherein a field of said record status control data for managing said track as said second control data recording area is same as that of said record status control data for managing said track for said record data.

* * * * *